US012785845B2

(12) United States Patent
Bar-Or Tillinger et al.

(10) Patent No.: US 12,785,845 B2
(45) Date of Patent: Nov. 3, 2026

(54) SET PARTITIONING FOR CHANNELS ASSOCIATED WITH PHASE NOISE

(71) Applicant: QUALCOMM Incorporated, San Diego, CA (US)

(72) Inventors: Amit Bar-Or Tillinger, Tel-Aviv (IL); Assaf Touboul, Netanya (IL); Shay Landis, Hod Hasharon (IL); Michael Levitsky, Rehovot (IL); Daniel Paz, Atlit (IL); Ronen Shaked, Kfar Saba (IL); Yaniv Eistein, Tel Aviv (IL); Guy Wolf, Rosh Haayin (IL); Ran Berliner, Kfar Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 865 days.

(21) Appl. No.: 18/192,626

(22) Filed: Mar. 29, 2023

(65) Prior Publication Data

US 2024/0333419 A1 Oct. 3, 2024

(51) Int. Cl.

| | |
|---|---|
| ***H04L 1/00*** | (2006.01) |
| ***H04L 27/38*** | (2006.01) |
| ***H04W 16/10*** | (2009.01) |

(52) U.S. Cl.

CPC ............ *H04L 1/001* (2013.01); *H04L 1/0004* (2013.01); *H04L 27/38* (2013.01); *H04W 16/10* (2013.01)

(58) Field of Classification Search

CPC ..... H04L 1/0003; H04L 1/0004; H04L 1/001; H04L 1/0015; H04L 1/0025; H04L 1/0026; H04L 1/0058; H04L 1/007; H04L 27/38; H04W 16/10

See application file for complete search history.

(56) References Cited

U.S. PATENT DOCUMENTS

| | | | | |
|---|---|---|---|---|
| 8,693,588 | B2 * | 4/2014 | McCloud | H04L 25/03242 375/341 |
| 9,632,978 | B2 * | 4/2017 | Park | G06F 15/7867 |
| 11,038,739 | B1 * | 6/2021 | Landis | H04L 27/3488 |
| 11,411,796 | B1 * | 8/2022 | Gulati | H04L 1/0058 |
| 11,539,557 | B1 * | 12/2022 | Paz | H04L 1/0058 |

(Continued)

OTHER PUBLICATIONS

International Search Report and Written Opinion—PCT/US2024/015742—ISA/EPO—Jun. 26, 2024.

*Primary Examiner* — Dung B Huynh
(74) *Attorney, Agent, or Firm* — Holland & Hart LLP

(57) ABSTRACT

Methods, systems, and devices for wireless communications are described. A user equipment (UE) may transmit first control information that is indicative of noise (e.g., phase noise, additive white gaussian noise (AWGN), or both) that impacts a spectral efficiency of a modulation and coding scheme (MCS). The MCS may be associated with a constellation of points that may be each representative of a respective candidate sequence of bit values encoded with a corresponding combination of signal amplitude and carrier phase. The UE may receive, based on transmitting the first control information, second control information that indicates a set of partitioning parameters indicative of a hierarchical partitioning of the constellation into a multiple subsets of points. As such, the UE may decode a message, modulated via the MCS, using the hierarchical partitioning indicated by the set of partitioning parameters.

29 Claims, 17 Drawing Sheets

(56) References Cited

U.S. PATENT DOCUMENTS 11,563,620 B2 1/2023 Paz et al.
12,425,885 B2* 9/2025 Barsoum ........ H04W 24/02
2004/0030979 A1* 2/2004 Shany ........ H03M 13/3746 714/752
2005/0213690 A1* 9/2005 Lauer ........ H03M 13/3961 375/341
2005/0243943 A1* 11/2005 Stirling-Gallacher ........ H04L 25/03184 375/267
2007/0133718 A1* 6/2007 Lee ........ H04L 27/3488 714/794
2012/0154031 A1* 6/2012 Zuckerman ........ H03L 7/185 327/551
2013/0089121 A1* 4/2013 Koo ........ H04L 25/067 375/150
2013/0121269 A1* 5/2013 Nammi ........ H04L 25/03343 370/329
2014/0062733 A1* 3/2014 Chrabieh ........ H04L 1/0048 341/107
2015/0071640 A1* 3/2015 Batshon ........ H04L 1/0058 398/91
2015/0098531 A1* 4/2015 Riabkov ........ H04L 1/0054 375/341
2015/0155924 A1* 6/2015 Qin ........ H04B 7/0473 375/267
2016/0043805 A1* 2/2016 Kakande ........ H04L 27/3488 398/43
2016/0344503 A1* 11/2016 Myung ........ H04L 1/0071
2017/0288935 A1* 10/2017 Montorsi ........ H04L 27/36
2017/0317786 A1* 11/2017 Chang ........ H04L 25/067
2017/0317864 A1* 11/2017 Yuan ........ H04L 27/04
2017/0338980 A1* 11/2017 Ku ........ H04L 25/40
2018/0076993 A1* 3/2018 Seo ........ H04L 27/2604
2018/0083824 A1* 3/2018 Yang ........ H04L 27/3405
2018/0183532 A1* 6/2018 Da Silva ........ H04B 17/336
2018/0198579 A1* 7/2018 Nammi ........ H04L 27/26025
2019/0052340 A1* 2/2019 Yuan ........ H04B 7/0617
2019/0097747 A1* 3/2019 Kim ........ H04B 10/0793
2019/0123832 A1* 4/2019 Alic ........ H04B 10/6165
2019/0215222 A1* 7/2019 Cheng ........ H04L 5/0021
2019/0305996 A1* 10/2019 Handte ........ H04L 1/0009
2020/0153570 A1* 5/2020 Peng ........ H04W 72/542
2020/0186283 A1* 6/2020 Handte ........ H04L 1/0041
2020/0358521 A1* 11/2020 Alagha ........ H04J 11/004
2021/0091895 A1* 3/2021 Liu ........ H04L 1/1822
2021/0135778 A1* 5/2021 Yoshida ........ H04B 10/5161
2021/0194620 A1* 6/2021 James ........ H04L 27/3405
2021/0226673 A1* 7/2021 Xie ........ H04L 1/0618
2021/0288862 A1* 9/2021 Tullberg ........ H04L 27/3411
2021/0297900 A1* 9/2021 Liu ........ H04W 28/06
2021/0314089 A1* 10/2021 Wu ........ H03M 13/1102
2021/0336754 A1* 10/2021 Horn ........ H04L 5/0083
2022/0014411 A1* 1/2022 Baligh ........ H04L 27/3488
2022/0029734 A1* 1/2022 Abdoli ........ H04L 1/0041
2022/0085894 A1* 3/2022 Oveis Gharan ........ H04B 10/532
2022/0109530 A1* 4/2022 Wilhelmsson ........ H04L 1/0003
2022/0255778 A1* 8/2022 Paz ........ H04B 7/0632
2022/0286225 A1* 9/2022 Liang ........ H04L 1/0065
2022/0312421 A1* 9/2022 Alizadeh ........ H04W 72/0473
2022/0353111 A1* 11/2022 Zhang ........ H04L 25/0236
2022/0376841 A1* 11/2022 Rubin ........ H04L 1/1812
2022/0386280 A1* 12/2022 Horn ........ H04L 27/26136
2022/0400044 A1* 12/2022 Paz ........ H04L 5/0053
2023/0078737 A1* 3/2023 Haque ........ H04L 27/0008 375/262
2023/0092517 A1* 3/2023 Montorsi ........ H04L 27/34 375/298
2023/0246732 A1* 8/2023 Eistein ........ H04L 5/0044 714/726
2023/0246895 A1* 8/2023 Xin ........ H04L 27/2042 375/262
2023/0261924 A1* 8/2023 Zewail ........ H04L 1/0025 370/329
2023/0262232 A1* 8/2023 Mao ........ H04N 19/65 375/240.13
2023/0318778 A1* 10/2023 Horn ........ H04L 5/0051
2023/0318900 A1* 10/2023 Bar-Or Tillinger ........ H04L 27/3405 375/262
2023/0388845 A1* 11/2023 Horn ........ H04W 28/0967
2024/0014924 A1* 1/2024 Landis ........ H04L 1/0028
2024/0056337 A1* 2/2024 Tervo ........ H04L 1/0009
2024/0089163 A1* 3/2024 Shaked ........ H04L 1/0003
2024/0098704 A1* 3/2024 Naguib ........ H04L 1/0075
2024/0106508 A1* 3/2024 Tang ........ H04L 1/0029
2024/0187131 A1* 6/2024 Wu ........ H04L 1/0057
2024/0187295 A1* 6/2024 Madadi ........ H04L 27/2695
2024/0223337 A1* 7/2024 Horn ........ H04L 5/006
2024/0267150 A1* 8/2024 Liang ........ H04L 1/0003
2024/0289627 A1* 8/2024 Tan ........ H04L 1/0009
2024/0333419 A1* 10/2024 Bar-Or Tillinger ... H04L 1/0026
2024/0356790 A1* 10/2024 Shi ........ H04L 27/3405
2024/0356793 A1* 10/2024 Shi ........ H04L 27/34
2024/0388333 A1* 11/2024 Koteshwar Srinath ........ H04L 1/0003
2025/0055594 A1* 2/2025 Yan ........ H04L 5/00
2025/0063409 A1* 2/2025 Landis ........ H04W 24/10
2025/0184204 A1* 6/2025 Jin ........ H04L 27/3405
2026/0163670 A1* 6/2026 Korpi ........ H04L 1/0009

* cited by examiner

SET PARTITIONING FOR CHANNELS ASSOCIATED WITH PHASE NOISE

FIELD OF TECHNOLOGY

The following relates to wireless communications, including set partitioning for channels associated with phase noise.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support set partitioning for channels associated with phase noise. For example, the described techniques provide for an increase in the spectral efficiency of messages encoded using quadrature amplitude modulation (QAM) by using a hierarchical coding and decoding scheme that accounts for phase noise and other noises that might affect the spectral efficiencies of the constellation subsets. For example, a user equipment (UE) may determine the relevant noise inherent to the operation of the UE, and may transmit uplink control information (UCI) that indicates at least the expected phase noise and additive white gaussian noise (AWGN) associated with a QAM constellation. As such, a network entity may receive the UCI and determine a multi-level coding (MLC) scheme for the QAM constellation that accounts for the indicated phase noise and AWGN. For example, the network entity may generate a set partitioning for the MLC scheme such that the respective subset of constellation points associated with each level of the hierarchy may be chosen to increase a Euclidian distance between nearest points in the subset in the presence of the indicated phase noise and AWGN. As such, the network entity may transmit downlink control information (DCI) that includes a set of partitioning parameters indicative of the generated set partitioning. The UE may use the set of partitioning parameters to decode messages modulated using the QAM constellation.

A method for wireless communications is described. The method may include transmitting first control information that is indicative of noise, at the UE, that impacts a spectral efficiency of a modulation and coding scheme (MCS), where the MCS is associated with a constellation of points that are each representative of a respective candidate sequence of bit values encoded with a corresponding combination of signal amplitude and carrier phase, receiving, based on transmitting the first control information, second control information that indicates a set of partitioning parameters, where the set of partitioning parameters is indicative of a hierarchical partitioning of the constellation into a set of multiple subsets of points, and decoding a message modulated via the MCS, where the decoding is hierarchical based on the set of multiple subsets of points.

An apparatus for wireless communications is described. The apparatus may include a processor, memory coupled with the processor, and instructions stored in the memory. The instructions may be executable by the processor to cause the apparatus to transmit first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase, receive, based on transmitting the first control information, second control information that indicates a set of partitioning parameters, where the set of partitioning parameters is indicative of a hierarchical partitioning of the constellation into a set of multiple subsets of points, and decode a message modulated via the MCS, where the decoding is hierarchical based on the set of multiple subsets of points.

Another apparatus for wireless communications is described. The apparatus may include means for transmitting first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase, means for receiving, based on transmitting the first control information, second control information that indicates a set of partitioning parameters, where the set of partitioning parameters is indicative of a hierarchical partitioning of the constellation into a set of multiple subsets of points, and means for decoding a message modulated via the MCS, where the decoding is hierarchical based on the set of multiple subsets of points.

A non-transitory computer-readable medium storing code for wireless communications is described. The code may include instructions executable by a processor to transmit first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase, receive, based on transmitting the first control information, second control information that indicates a set of partitioning parameters, where the set of partitioning parameters is indicative of a hierarchical partitioning of the constellation into a set of multiple subsets of points, and decode a message modulated via the MCS, where the decoding is hierarchical based on the set of multiple subsets of points.

Some examples of the method, apparatuses, and non-transitory computer-readable medium described herein may further include operations, features, means, or instructions for determining, based on the set of partitioning parameters, a mapping between individual subsets of points of the constellation and respective levels of the hierarchical partitioning, each of the respective levels of the hierarchical partitioning also associated with a corresponding code rate included in the set of partitioning parameters or received in a third control information.

In some examples of the method, apparatuses, and non-transitory computer-readable medium described herein, decoding the message may include operations, features, means, or instructions for identifying that the message includes an encoded sequence of bit values from the respective candidate sequence of bit values, where each respective level of the hierarchical partitioning may be used to determine a value of one bit for each of one or more received points of the constellation.

Some examples of the method, apparatuses, and non-transitory computer-readable medium described herein may further include operations, features, means, or instructions for decoding a first bit for each of the one or more received points of the constellation using a first subset of points of the constellation and a first code rate associated with a first level of the hierarchical partitioning and decoding a second bit for each of the one or more received points of the constellation using a second subset of points of the constellation and a second code rate associated with a second level of the hierarchical partitioning, where the second subset of points may be a subset of the first subset of points.

In some examples of the method, apparatuses, and non-transitory computer-readable medium described herein, the mapping results in the spectral efficiency of the MCS satisfying a threshold value.

Some examples of the method, apparatuses, and non-transitory computer-readable medium described herein may further include operations, features, means, or instructions for estimating an AWGN metric and a phase noise metric associated with the UE, where the first control information that may be indicative of noise includes an indication of the AWGN metric and the phase noise metric.

In some examples of the method, apparatuses, and non-transitory computer-readable medium described herein, individual subsets of the set of multiple subsets of points may be based on Euclidean distances between points in the constellation and the Euclidean distances may be based on the noise indicated in the first control information.

In some examples of the method, apparatuses, and non-transitory computer-readable medium described herein, the MCS may be associated with QAM and the hierarchical partitioning includes a QAM MLC.

In some examples of the method, apparatuses, and non-transitory computer-readable medium described herein, the first control information may be included in an UCI message and the second control information may be included in a DCI message.

A method for wireless communications is described. The method may include receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase, transmitting, based on transmitting the first control information, second control information that indicates a set of partitioning parameters, where the set of partitioning parameters is indicative of a hierarchical partitioning of the constellation into a set of multiple subsets of points, and transmitting a message via the MCS, where decoding the message is hierarchical based on the set of multiple subsets of points.

An apparatus for wireless communications is described. The apparatus may include a processor, memory coupled with the processor, and instructions stored in the memory. The instructions may be executable by the processor to cause the apparatus to receive first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase, transmit, based on transmitting the first control information, second control information that indicates a set of partitioning parameters, where the set of partitioning parameters is indicative of a hierarchical partitioning of the constellation into a set of multiple subsets of points, and transmit a message via the MCS, where decoding the message is hierarchical based on the set of multiple subsets of points.

Another apparatus for wireless communications is described. The apparatus may include means for receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase, means for transmitting, based on transmitting the first control information, second control information that indicates a set of partitioning parameters, where the set of partitioning parameters is indicative of a hierarchical partitioning of the constellation into a set of multiple subsets of points, and means for transmitting a message via the MCS, where decoding the message is hierarchical based on the set of multiple subsets of points.

A non-transitory computer-readable medium storing code for wireless communications is described. The code may include instructions executable by a processor to receive first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase, transmit, based on transmitting the first control information, second control information that indicates a set of partitioning parameters, where the set of partitioning parameters is indicative of a hierarchical partitioning of the constellation into a set of multiple subsets of points, and transmit a message via the MCS, where decoding the message is hierarchical based on the set of multiple subsets of points.

In some examples of the method, apparatuses, and non-transitory computer-readable medium described herein, mapping between individual subsets of points of the constellation and respective levels of the hierarchical partitioning, each of the respective levels of the hierarchical partitioning also associated with a corresponding code rate indicated to the UE via the set of partitioning parameters or via a third control information.

Some examples of the method, apparatuses, and non-transitory computer-readable medium described herein may further include operations, features, means, or instructions for encoding, via the MCS, the message in accordance with the mapping associated with the set of partitioning parameters and the corresponding code rate for each of the respective levels of the hierarchical partitioning, the encoded message including an encoded sequence of bit values from the respective candidate sequence of bit values, where each respective level of the hierarchical partitioning may be associated with a value of one bit for each of one or more points of the constellation.

In some examples of the method, apparatuses, and non-transitory computer-readable medium described herein, the mapping may include operations, features, means, or instructions for generating the individual subsets of points of the constellation and the corresponding code rate for the respective levels of the hierarchical partitioning such that the spectral efficiency of the MCS satisfies a configured threshold.

In some examples of the method, apparatuses, and non-transitory computer-readable medium described herein, the mapping may include operations, features, means, or instructions for selecting, from a predefined list, the individual subsets of points of the constellation and the corresponding code rate for the respective levels of the hierarchical partitioning such that the spectral efficiency of the MCS satisfies a configured threshold.

In some examples of the method, apparatuses, and non-transitory computer-readable medium described herein, receiving the first control information that may be indicative of noise may include operations, features, means, or instructions for receiving an indication of an AWGN metric and a phase noise metric associated with the UE, where the set of partitioning parameters may be based on the AWGN metric and a phase noise metric.

In some examples of the method, apparatuses, and non-transitory computer-readable medium described herein, individual subsets of the set of multiple subsets of points may be based on Euclidean distances between points in the constellation and the Euclidean distances may be based on the noise indicated in the first control information.

In some examples of the method, apparatuses, and non-transitory computer-readable medium described herein, the MCS may be associated with a QAM scheme and the hierarchical partitioning includes a QAM MLC.

In some examples of the method, apparatuses, and non-transitory computer-readable medium described herein, the first control information may be included in an UCI message and the second control information may be included in a DCI message.

DETAILED DESCRIPTION

Figure 1:
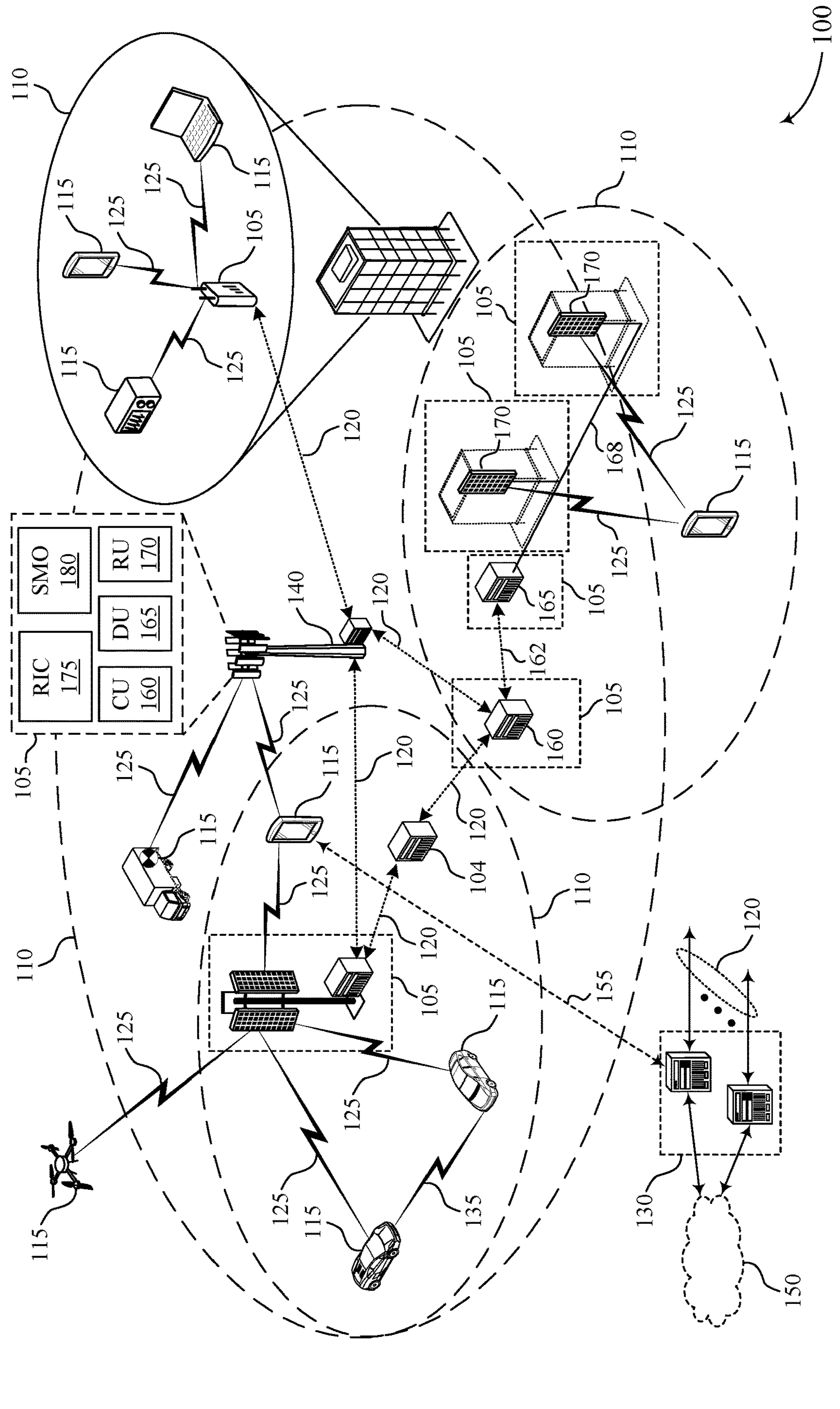
FIG. 1 shows an example of a wireless communications system that supports set partitioning for channels associated with phase noise in accordance with one or more aspects of the present disclosure.

Some wireless communications systems may support a modulation and coding scheme (MCS) that includes quadrature amplitude modulation (QAM). Each QAM scheme (e.g., 16 QAM, 64 QAM, etc.) may be associated with a constellation of points, which maps different phase shifts and signal amplitudes that may be used to represent a sequence of bits. For instance, a 16 QAM constellation includes 16 different points, where each point indicates a unique phase shift and amplitude that may be representative of a four-bit sequence. A wireless device (e.g., a user equipment (UE)) may also support multi-level coding (MLC) or decoding schemes in which the device may use set partitioning to map individual bits of the bit sequence onto a subset of the constellation of points. For example, the constellation may be divided into two subsets of constellation points. Bit sequences with a first bit having a value of 0 may be carried by all points in the first subset, while bit sequences with a first bit having a value of 1 may be carried by all points in the second subset. The decoding UE may determine the value of the first bit by determining the subset in which a point that corresponds to the signal is located. The next bit of the sequence is determined based on sub-subsets of the first subset of points.

Each successive level of subsets may include points that are further apart, thus increasing the confidence that the correct point has been identified. In this way, hierarchical decoding of the constellation generally results in more robust decoding. However phase noise associated with a message may distort the angular separation of the constellation points which may reduce a Euclidian distance between individual points within a subset. If not accounted for, the phase noise could affect the Euclidian distance such that the points within any given subset may be closer together compared to the previous subset, thus resulting in less confidence in the decoding. As such, the spectral efficiency of the MCS may decrease.

Wireless devices may increase the spectral efficiency of messages encoded using QAM if the point subsets used in hierarchical coding and decoding are selected to account for phase noise and other noises that might affect the spectral efficiencies of the constellation subsets. For example, a UE may determine the relevant noise inherent to the UE's operation, and may transmit uplink control information (UCI) that indicates at least the expected phase noise and additive white gaussian noise (AWGN) associated with a QAM constellation. As such, a network entity may receive the UCI and determine an MLC scheme for the QAM constellation that accounts for the indicated phase noise and AWGN. For example, the network entity may generate the set partitioning for the MLC scheme such that the respective subset of constellation points associated with each level of the hierarchy may be chosen to increase the Euclidian distance (e.g., above a threshold value) between nearest points in the subset in the presence of the phase noise and AWGN indicated by the UE. As such, the network entity may transmit downlink control information (DCI) that includes a set of partitioning parameters indicative of the generated set partitioning. The UE may use the set of partitioning parameters to decode messages modulated using the QAM constellation.

Aspects of the disclosure are initially described in the context of wireless communications systems. Aspects of the disclosure are additionally described in the context of a message decoding procedure and a process flow. Aspects of the disclosure are further illustrated by and described with reference to apparatus diagrams, system diagrams, and flowcharts that relate to set partitioning for channels associated with phase noise.

FIG. 1 shows an example of a wireless communications system 100 that supports set partitioning for channels associated with phase noise in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support set partitioning for channels associated with phase noise as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, wireless communications system 100 may support an MCS that includes QAM. Each QAM scheme (e.g., 16 QAM, 64 QAM, etc.) may be associated with a constellation of points, which maps different phase shifts and signal amplitudes that may be used to represent a sequence of bits. For instance, a 16 QAM constellation includes 16 different points, where each point indicates a unique phase shift and amplitude that may be representative of a four-bit sequence. A UE 115 may also support multi-level coding or decoding schemes in which the device may use set partitioning to map individual bits of the bit sequence onto a subset of the constellation of points. For example, the constellation may be divided into two subsets of constellation points. Bit sequences with a first bit having a value of 0 may be carried by a point in the first subset, while bit sequences with a first bit having a value of 1 may be carried by a point in the second subset. The decoding UE 115 may determine the value of the first bit by determining the subset in which a point that corresponds to the signal is located. The next bit of the sequence may be determined based on sub-subsets of the first subset of points.

As such, wireless devices may increase the spectral efficiency of messages encoded using QAM if the point subsets used in hierarchical coding and decoding are selected to account for phase noise and other noises that might affect the spectral efficiencies of the constellation subsets. For example, the UE 115 may determine the relevant noise inherent to operation of the UE 115, and may transmit UCI that indicates at least the expected phase noise and AWGN associated with a QAM constellation. As such, a network entity 105 may receive the UCI and determine an MLC scheme for the QAM constellation that accounts for the indicated phase noise and AWGN. For example, the network entity 105 may generate the set partitioning for the MLC scheme such that the respective subset of constellation points associated with each level of the hierarchy may be chosen to increase the Euclidian distance (e.g., above a threshold value) between nearest points in the subset in the presence of the phase noise and AWGN indicated by the UE 115. As such, the network entity 105 may transmit DCI that includes a set of partitioning parameters indicative of the generated set partitioning. The UE 115 may use the set of partitioning parameters to decode messages modulated using the QAM constellation.

Figure 2:
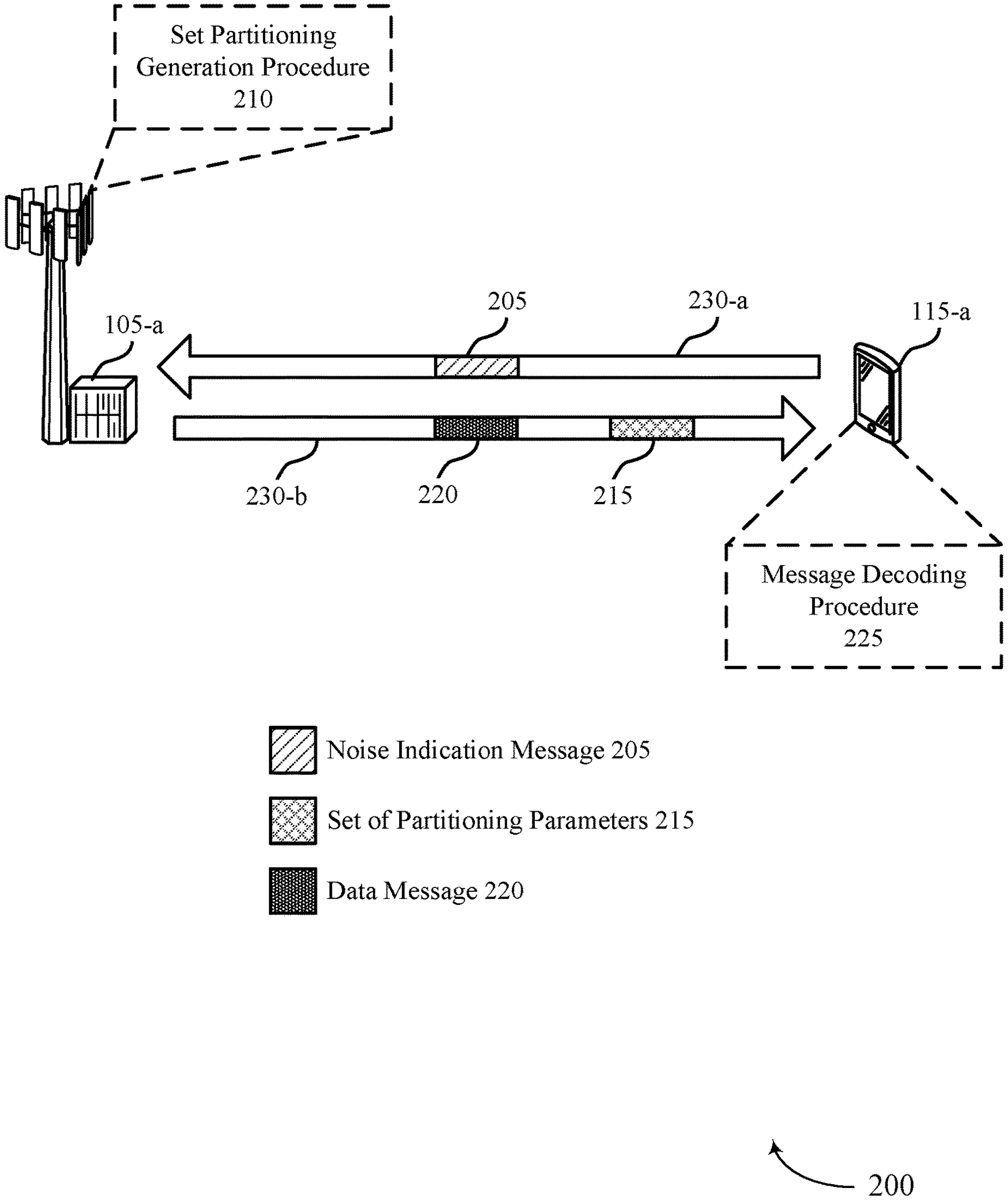
FIG. 2 shows an example of a wireless communications system that supports set partitioning for channels associated with phase noise in accordance with one or more aspects of the present disclosure.

FIG. 2 shows an example of a wireless communications system 200 that supports set partitioning for channels associated with phase noise in accordance with one or more aspects of the present disclosure. In some examples, the wireless communications system 200 may implement aspects of the wireless communications system 100. For example, the wireless communications system 200 may include a UE 115-*a* and a network entity 105-*a*, which may be respective examples of a UE 115 or a network entity 105 as described with reference to FIG. 1. In some examples, the UE 115-*a* and the network entity 105-*a* may communicate via one or more communication links 230 (e.g., a communication link 230-*a* or a communication link 230-*b*). In the example of FIG. 2, the communication links 230 may be uplinks or downlinks, among other examples.

In some examples of the wireless communications system 200, the UE 115-*a* and network entity 105-*a* may support decoding and encoding schemes, such as MCS, that includes QAM. For instance, each QAM scheme (e.g., 16 QAM, 64 QAM, etc.) may be associated with a set constellations points, where each constellation point may be mapped to a respective phase shift and signal amplitude that may be used to represent a sequence of bits. For example, a 16 QAM constellation may include 16 different constellation pointes, where each constellation point may indicate a unique phase shift and amplitude that is representative of a four-bit sequence. Further discussion of QAM constellations are illustrated and described with reference to FIGS. 3 and 4.

As such, wireless devices may operate in accordance with an MLC to encode and decode a set of bits of a message (e.g., a data message 220) using a QAM constellation. For example, the network entity 105-*a* may use a set partitioning to map individual bits of a downlink message onto a subset of the constellation points. For instance, the constellation may be divided into two subsets of constellation points. Bit sequences with a first bit having a value of 0 may be carried by constellation points in the first subset, while bit sequences with a first bit having a value of 1 may be carried by constellation points in the second subset.

As such, the UE 115-*a* may receive the downlink message (e.g., encoded in accordance with a QAM scheme) and determine the value of the first bit by determining the subset in which a constellation point that corresponds to the downlink message is located. The UE 115-*a* may determine the next bit of the sequence based on sub-subsets of the first subset of points (e.g., hierarchical decoding). Each successive level of subsets includes points that may be further apart (e.g., each level is associated with a greater Euclidian distance). As the Euclidian distance between the constellation points increases for each successive level of the decoding process, the confidence that the correct constellation point has been identified may increase. As such, hierarchical decoding of a QAM constellation may improve the spectral efficiency and power consumption associated with decoding the signal.

In some cases, however, noise associated with a message may distort separation of constellation points in a QAM constellation. For example, a reception of a signal at the UE 115-*a* may be associated with AWGN. In some examples, AWGN may be omnidirectional (e.g., noise causing distortion to both the amplitude and angular location of constellation points of a QAM constellation). As such, AWGN may proportionally reduce Euclidian distance between constellation points across the constellation map.

Additionally, or alternatively, noise of a signal may be associated with phase noise. In some examples, phase noise of a signal may distort angular separation of the constellation points. As such, phase noise may disproportionately reduce the Euclidian distance between different constellation points across the constellation map. If not accounted for, the phase noise may affect the Euclidian distance such that the points within any given subset may be closer together than in the previous subset, thus resulting in less confidence in the decoding. Additionally, phase noise may become more prominent for higher frequency ranges (e.g., frequency bands for FR4, FR5, and 6G) as the phase noise power may increase in accordance with an increase in carrier frequency. Additionally, or alternatively, support for higher order constellations (e.g., 16 QAM, 64 QAM, 256 QAM, etc.) may decrease the difference in phase between each of the constellation points, increasing the effects of phase noise. As such, it may be advantageous to operate in accordance with one or more techniques to decrease noise associated with QAM constellations to improve the associated spectral efficiency and power consumption.

According to the techniques described herein, wireless devices may increase the spectral efficiency of messages encoded using QAM by generating hierarchical coding and decoding schemes that account for noise associated with the constellation points. For example, the UE 115-*a* may transmit to the network entity 105-*a* UCI that may be indicative of noise associated with a QAM constellation, and the network entity 105-*a* may respond with an indication of an MLC scheme that accounts for the noise indicated in the UCI.

As illustrated in FIG. 2, the UE 115-*a* may transmit a noise indication message 205 (e.g., a control message including UCI). In some examples, the noise indication message 205 may include one or more noise metrics that may be associated with receiving a message encoded using a QAM. For instance, the noise indication message 205 may include a first noise metric indicating an expected phase noise power and a second noise metric indicating a post equalization AWGN. In some examples, the UE 115-*a* may estimate the first and second noise metrics based on intrinsic noise associated with one or more components of the UE 115-*a* (e.g., components used to receive and decode a message encoded with QAM). In some examples, the UE 115-*a* may receive one or more reference signals (e.g., from the network entity 105-*a*) to estimate the first and second noise metrics. In some examples, the UE 115-*a* may estimate respective first and second noise metrics for different QAM constellation sizes. For instance, the UE 115-*a* may estimate a different first and second noise metrics for 16 QAM and 64 QAM. In some examples, the UE 115-*a* may estimate a first and second noise metric that is the same across all QAM constellation sizes.

As such, the network entity 105-*a* may receive the noise indication message 205, and determine an MLC scheme for the QAM constellation that accounts for the indicated phase noise and AWGN. For example, as part of a set partitioning generation procedure 210, the network entity 105-*a* may generate a set partitioning for the MLC scheme such that the respective subset of constellation points associated with each level of hierarchy may be chosen to maximize (e.g., increase above a configured threshold) the Euclidian distance between nearest points in each subset in the presence of the noise metrics indicated by the UE 115-*a*. As such, the network entity 105-*a* may transmit DCI that includes a set of partitioning parameters 215 indicative of the set partitioning (e.g., generated via set partitioning generation procedure 210). In some examples, the set of partitioning parameters 215 may indicate a subset of constellation points and a code rate for each level of the set partitioning hierarchy. For instance, the set of partitioning parameters 215 may indicate a string of bits associated with each level of the set portioning hierarchy, where the string of bits indicate the subset of constellation points and the code rate associated with each level. Further discussion of the set partitioning generation procedure 210 is described herein, including with reference to FIG. 4.

The UE 115-*a* may use the received set of partitioning parameters 215 to decode messages modulated using the QAM constellation. For example, the UE 115-*a* may receive data message 220 which may be modulated using the QAM constellation, where the UE 115-*a* decodes the data message 220 using message decoding procedure 225. In some examples, the message decoding procedure 225 uses the set of partitioning parameters 215 to decode each level of the data message 220 in the presence of the phase noise and AWGN indicated by the UE 115-*a*. Further discussion of the message decoding procedure 225 is described herein, including with reference to FIG. 3.

Figure 3:
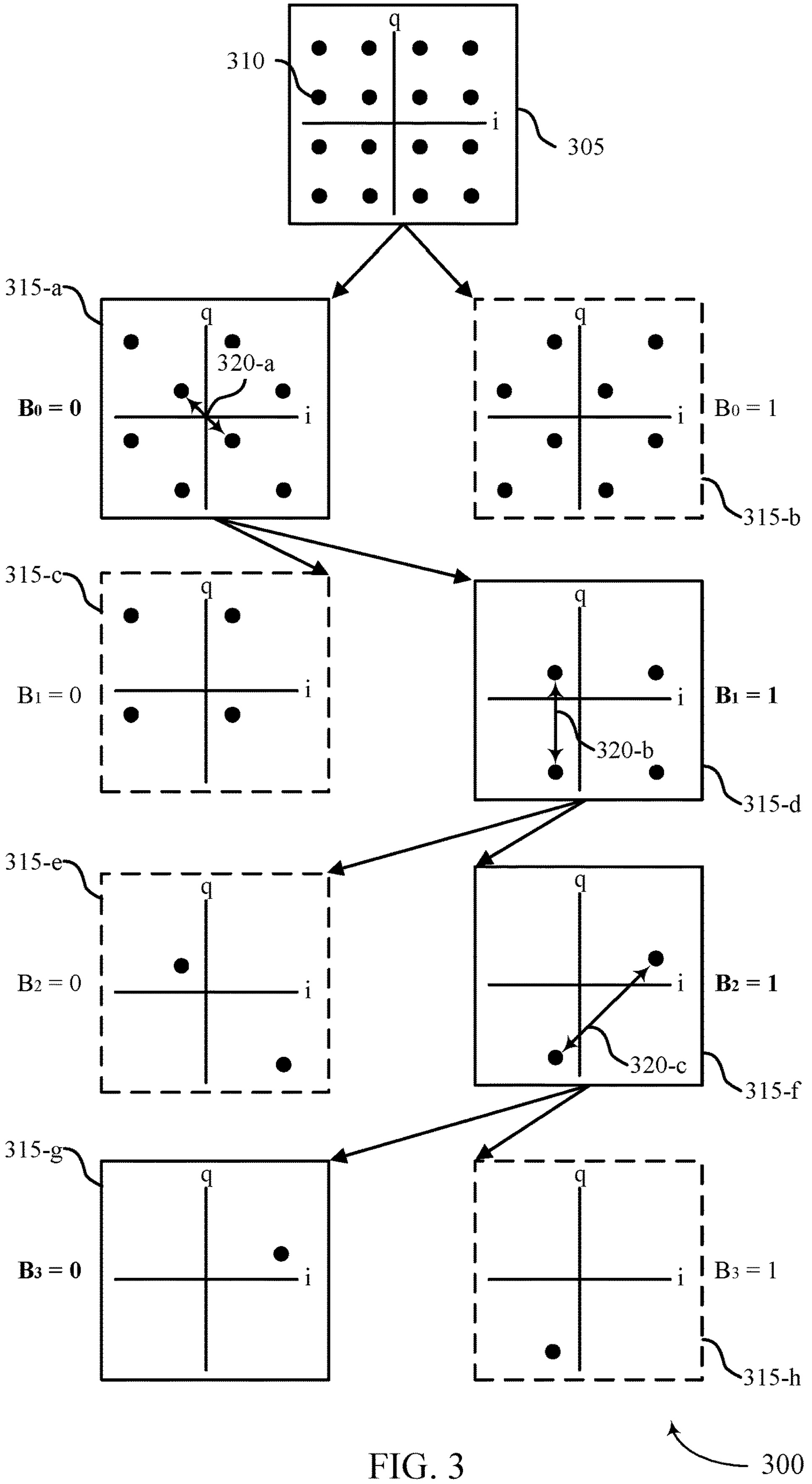
FIG. 3 shows an example of a message decoding procedure that supports set partitioning for channels associated with phase noise in accordance with one or more aspects of the present disclosure.

FIG. 3 shows an example of a message decoding procedure 300 that supports set partitioning for channels associated with phase noise in accordance with one or more aspects of the present disclosure. In some examples, the message decoding procedure 300 may implement aspects of the wireless communications system 100 and 200. For example, the message decoding procedure 300 may be an example of the message decoding procedure 225 as described with reference to FIG. 2. As such, a UE 115 may perform the message decoding procedure 300 to decode a message that may be encoded by a network entity using QAM.

In some examples, a message encoded using QAM (e.g., a modulated signal) may be illustrated using a constellation diagram 305. For example, the information (e.g., bits) transmitted via the modulated signal may be represented by a set of constellation points 310 (e.g., phase and amplitude combinations encoded over a time duration of the encoded message), and each constellation point 310 may be represented by a point on the constellation diagram 305. That is each constellation point 310 illustrated by the constellation diagrams 305 may correspond to a vector of a modulated signal with a particular in-phase component (i) and a particular quadrature component (q). In the example of FIG. 3, the modulated signal is encoded using a 16 QAM. As such, the modulated signal may include respective sets of four-value bit (e.g., [$B_0$, $B_1$, $B_2$, $B_3$]) for each constellation point 310 included in encoded in the modulated signal. It is understood that the techniques described herein may be used for a QAM constellation of any size associated with a modulated signal that has any quantity of constellation points 310 that are associated with respective bit sequences of any length.

In some examples, the UE may decode the modulated signal using an MLC scheme that utilizes set partitioning. For example, as described with reference to FIG. 2, a network entity may transmit to the UE a set of partitioning parameters 215 that indicates a set partitioning for an MLC scheme. The set partitioning may be an MLC technique for hierarchical separation of the constellation into subsets of constellation points (e.g., subsets 315) with an increasing smallest Euclidian distance 320 for each successive level of the hierarchy (e.g., Euclidian distance 320-*a*, 320-*b*, and 320-*c*). As illustrated in FIG. 3, the set of partitioning parameters 215 may associate subsets 315-*a* and 315-*b* with a first level of the hierarchy, subsets 315-*c* and 315-*d* with a second level of the hierarchy, subsets 315-*c* and 315-*f* with a third level of the hierarchy, and subsets 315-*g* and 315-*h* with a fourth level of the hierarchy.

In some cases, the coding of the information carried by each level of the hierarchy may be protected by a different coding rate to increase spectral efficiency. As such, the set of partitioning parameters 215 may indicate a coding rate associated with each level of the hierarchy for the UE to use to perform the message decoding procedure 300. In some examples, higher levels (e.g., the first level) of the hierarchy may be encoded with additional redundancy (e.g., a lower coding rate) compared to lower levels (e.g., the second level) of the hierarchy. For instance Euclidian distance 320-*a* of subset 315-*a* associated with the first level may be smaller than Euclidian distance 320-*b* of subset 315-*d* associated with second level. Due to a smaller separation of constellation points 310 in subset 315-*a*, the first of the hierarchy may benefit from a lower coding rate to increase protection from decoding errors.

As such, the UE may use the set of partitioning parameters 215 to decode each level of the hierarchy. For simplicity, FIG. 3 illustrates the UE decoding a bit sequence associated with a single constellation point 310. However, it is understood, that the UE may use message decoding procedure 300 to decode multiple bit sequences associated with each constellation point 310 encoded in the modulated signal. That is, FIG. 3, may illustrate a subset of a full hierarchical tree, where the full hierarchical tree may additionally illustrate subsets 315 associated with bit sequences that start with 1 (e.g., illustrate the cases for $B_0$=1). As such, the UE may use each level of the hierarchy to decode one bit value for each of the multiple bit sequences included in the modulated signal.

In the example of FIG. 3, the modulated signal may include at least the bit sequence [$B_0$, $B_1$, $B_2$, $B_3$] where decoding a level of the hierarchy may identify a respective bit of the bit sequence. For instance, subset 315-*a* may include constellation points 310 associated with bit sequences with a first bit having a value of 0 (e.g., $B_0$=0) and subset 315-*b* may include constellation points 310 associated with bit sequences with a first bit having a value of 1 (e.g., $B_0$=1). In the example of FIG. 3, the UE may perform a parity check (e.g., a low density parity check (LDPC)) and identify that the modulated signal is located in subset 315-*a* (e.g., $B_0$=0).

The UE may determine the second bit of the bit sequence using subsets 315-*c* and 315-*d* from level 2 of the hierarchy. In some cases, the subsets 315 of a given level of the hierarchy may be based on the subset 315 identified in the previous level of the hierarchy. For example, as illustrated in FIG. 3, subsets 315-*c* and 315-*d* may be sub-subsets of subset 315-*a*, where subset 315-*c* may be associated with bit sequences with a second bit having a value of 0 (e.g., $B_1$=0) and subset 315-*d* may be associated with bit sequences with a second bit having a value of 1 (e.g., $B_1$=1). In the example of FIG. 3, the UE may perform a parity check (e.g., LDPC) and identify that the modulated signal is located in subset 315-*d* (e.g., $B_1$=1).

The UE may determine the third bit of the bit sequence using subsets 315-*e* and 315-*f*, which may be sub-subsets of subset 315-*d*. For example, subset 315-*e* may be associated with bit sequences with a third bit having a value of 0 (e.g., $B_2$=0) and subset 315-*f* may be associated with bit sequences with a third bit having a value of 1 (e.g., $B_2$=1). In the example of FIG. 3, the UE may perform a parity check (e.g., LDPC) and identify that the modulated signal is located in subset 315-*f* (e.g., $B_2$=1).

The UE may determine the fourth bit of the bit sequence using subsets 315-*g* and 315-*h*, which may be sub-subsets of subset 315-*f*. For example, subset 315-*g* may be associated with bit sequences with a fourth bit having a value of 0 (e.g., $B_3$=0) and subset 315-*f* may be associated with bit sequences with a fourth bit having a value of 1 (e.g., $B_3$=1). In the example of FIG. 3, the UE may perform a parity check (e.g., LDPC) and identify that the modulated signal is located at the constellation point 310 included in 315-*g* (e.g., $B_3$=0). As such, the UE may identify that the bit sequence encoded in the modulate signal is [0,1,1,0].

By utilizing the set of partitioning parameters 215 to perform the message decoding procedure 300 may benefit from an increase in decoding reliability. Each successive level of the hierarchy includes subsets 315 with constellation points 310 that are further apart, thus increasing the Euclidian distance 320 and confidence that the correct point has been identified. Additionally, message decoding procedure 300 benefits from additional redundancy based on the subsets 315 of a given level being sub-subsets of the previous level. Further discussion of generating the set of partitioning parameters 215 in the presence of noise is described herein, including with reference to FIG. 4.

Figure 4:
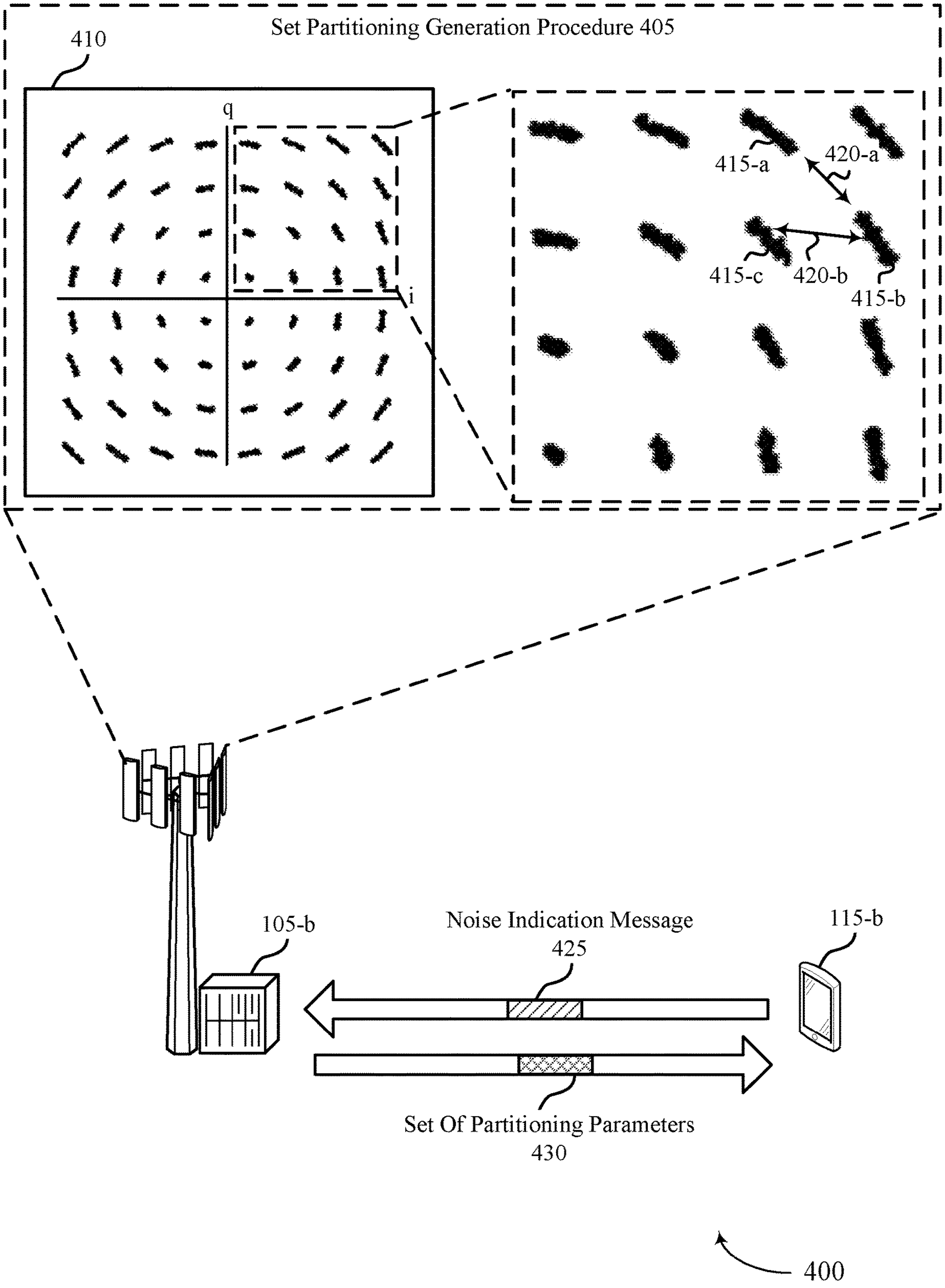
FIG. 4 shows an example of a wireless communications system that supports set partitioning for channels associated with phase noise in accordance with one or more aspects of the present disclosure.

FIG. 4 shows an example of a wireless communications system 400 that supports set partitioning for channels associated with phase noise in accordance with one or more aspects of the present disclosure. In some examples, the wireless communications system 400 may implement aspects of the wireless communications system 100 and 200. For example, the wireless communications system 400 may include a UE 115-*b* and a network entity 105-*b*, which may be respective examples of a UE 115 or a network entity 105 as described with reference to FIG. 1. Additionally, noise indication message 425, set partitioning generation procedure 405, and set of partitioning parameters 430 may be respective examples of noise indication message 205, set partitioning generation procedure 210, and set of partitioning parameters 215, as described with reference to FIG. 2.

As described with reference to FIG. 2, the UE 115-*b* may transmit the noise indication message 425, which may include one or more noise metrics. In some examples, the noise metrics may be associated with distortions of a received post equalization signal at the receiver of the UE 115-*b*. In some examples, the noise metrics may include an estimation for the expected residual phase noise power and the post equalization AWGN that the UE 115-*b* may experience when receiving a signal modulated with QAM.

As such, the network entity 105-*b* may receive the noise metrics included in the noise indication message 425, and estimate what affects the noise metrics may have on a QAM constellation. For example, constellation diagram 410 may be an example of a 64 QAM that includes 64 constellation points 415 that account for the expected noise metrics indicated in the noise indication message 425. In some examples, the AWGN noise metric may result in omnidirectional distortion of constellation points 415 (e.g., distortion in both the amplitude and angular phase of the constellation points 415). In some examples, the phase noise metric may result in additional angular distortion of the constellation points. For example, constellation points 415-*a*, 415-*b*, and 415-*c* may illustrate non-uniform points that are distorted across the angular direction of constellation diagram 410. Additionally, constellation points 415 associated with a greater signal amplitude (e.g., points associated with a greater in-phase component (i) and a greater quadrature component (q)) may experience greater angular distortions. That is, constellation points 415-*a* and 415-*b* may have greater angular distortion compared to constellation point 415-*c* due to an increase in residual phase noise power.

As such, a Euclidian distance 420 between a two constellation points 415 may be based on the expected phase noise and AWGN indicated by the UE 115-*b*. For example, Euclidian distance 420-*a* may be the distance between constellation points 415-*a* and 415-*b*, and Euclidian distance 420-*b* may be the distance between constellation points 415-*b* and 415-*c*. In an ideal communications system that does not include noise, the Euclidian distance 420-*a* may be greater than the Euclidian distance 420-*b*, and in a communications system that accounts for the expected phase noise and AWGN, the Euclidian distance 420-*b* may be greater than the Euclidian distance 420-*a*.

According to the techniques described herein, the network entity 105-*b* may encode signals using QAM in accordance with an MLC scheme that accounts for noise in the QAM. For example, the MLC scheme may use set partitioning to separate the constellation of points into subsets of constellation points associated with different levels of a partitioning hierarchy (e.g., as described with reference to FIG. 3). The network entity 105-*b* may determine the subsets of the constellation points associated with each level of the hierarchy to maximize (e.g., increase above a threshold value) the smallest Euclidian distance 420 associated with each level of the hierarchy in the presence of noise. That is, the network entity 105-*b* may generate the hierarchical partitioning used to encode a signal via QAM by accounting for the estimated noise metrics indicated by the UE 115-*b* in the noise indication message 425.

Based on identifying the hierarchical partitioning in the presence of noise, the network may generate a set of partitioning parameters 430 using the set partitioning generation procedure 405. For example, the set of partitioning parameters 430 may indicate the subset of constellation points and a code rate for each level of the hierarchy. In some examples, the network entity 105-*b* may calculate (e.g., generate) the set of partitioning parameters 430 to maximize the Euclidian distance for each level of the hierarchy in the presence of the noise metrics indicated by the UE 115-*b*. In some other examples, the network entity 105-*b* may be pre-configured (e.g., pre-defined) with multiple sets of partitioning parameters, and may select the set of partitioning parameters 430 based on the noise metrics indicated by the UE 115-*b*. For example, the expected phase noise and AWGN indicated by the UE 115-*b* may be of values that correspond to a first set of partitioning parameters 430 predefined at the network entity 105-*b*, and as such, the network entity 105-*b* may select the first set of partitioning parameters 430.

Based on identifying the set of partitioning parameters 430 using the set partitioning generation procedure 405, the network entity 105-*b* may transmit the set of partitioning parameters 430 to the UE 115-*b* in a control message (e.g., via DCI). As such, the UE 115-*b* may use the indicated set of partitioning parameters 430 to decode messages in accordance with the techniques described with reference to FIG. 3.

Figure 5:
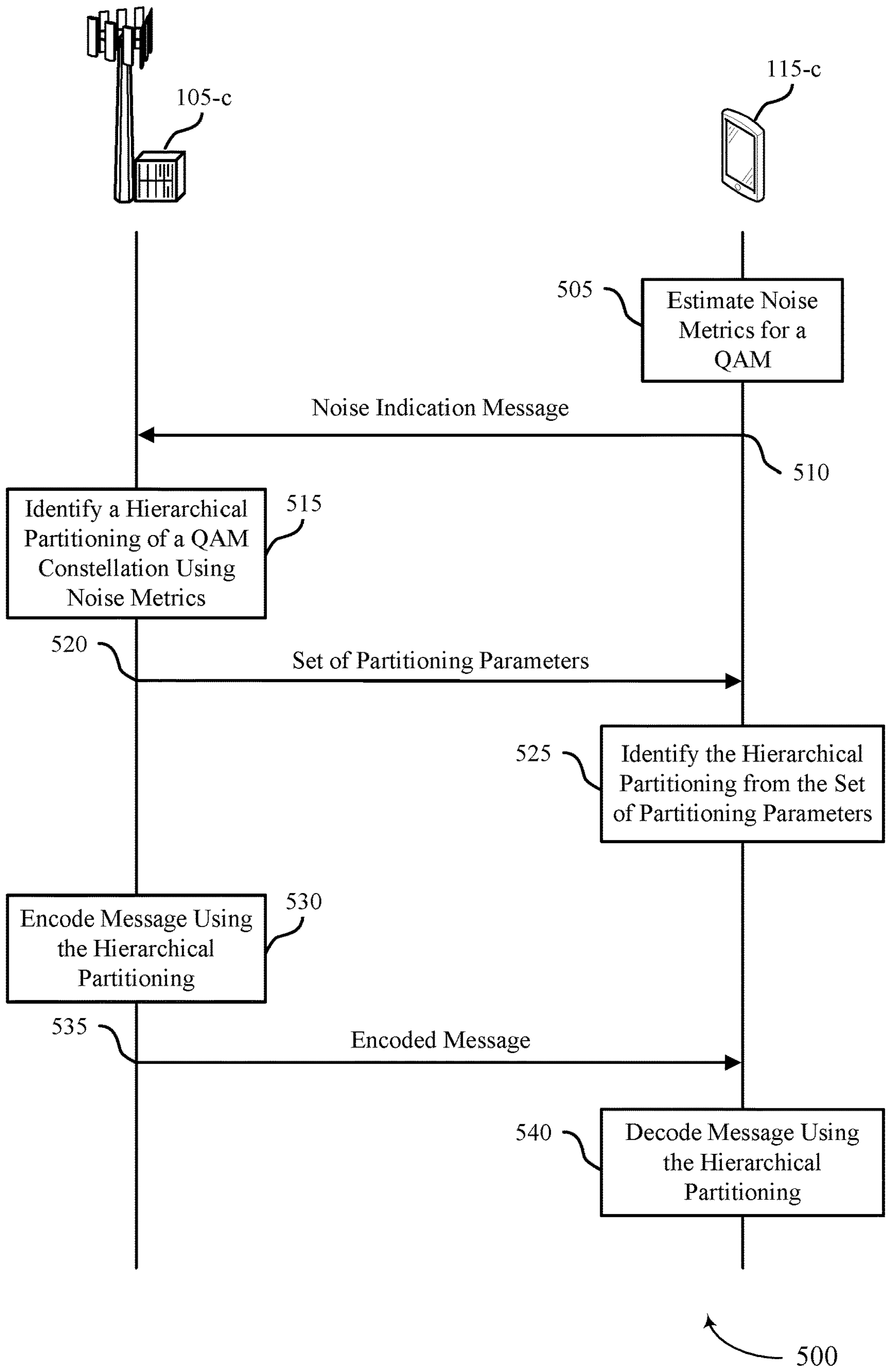
FIG. 5 shows an example of a process flow that supports set partitioning for channels associated with phase noise in accordance with one or more aspects of the present disclosure.

FIG. 5 shows an example of a process flow 500 that supports set partitioning for channels associated with phase noise in accordance with one or more aspects of the present disclosure. In some examples, process flow 500 may implement aspects of wireless communications system 100, wireless communications system 200, message decoding procedure 300, and wireless communications system 400. Process flow 500 includes a UE 115-*c* and a network entity 105-*c* which may be respective examples of a UE 115 and a network entity 105, as described with reference to FIGS. 1 through 4. Alternative examples of the following may be implemented, where some steps are performed in a different order than described or are not performed at all. In some cases, steps may include additional features not mentioned below, or further steps may be added. In addition, while process flow 500 shows processes between a single UE 115 and a single network entity 105, it should be understood that these processes may occur between any quantity of network devices and network device types.

At 505, the UE 115-*c* may estimate one or more noise metrics that may impact a spectral efficiency of an MCS. For instance, the MCS may be an example of QAM scheme that is associated with a constellation of points (e.g., 16 QAM, 64 QAM, etc.), where the constellation of points may be each representative of a respective candidate sequence of bit values encoded with a corresponding combination of signal amplitude and carrier phase. As such, the UE 115-*c* may estimate an AWGN metric, a phase noise metric, or both associated with receiving QAM messages at the UE 115-*c*.

At 510, the UE 115-*c* may transmit a noise indication message that is indicative of the noise estimated by the UE 115-*c*. For example, the noise indication message may include first control information that indicates the AWGN metric, the phase noise metric, or both that the UE 115-*c* estimated. In some examples, the first control information may be UCI and the noise indication message may be a UCI message.

At 515, the network entity 105-*c* may identify a hierarchical partitioning of the constellation of points based on the noise metrics received from the UE 115-*c*. For example, the network entity 105-*c* may map between individual subsets of points of the constellation and respective levels of the hierarchical partitioning. In some examples, each of the respective levels of the hierarchical partitioning may also be associated with a corresponding code rate. In some examples, the network entity 105-*c* may generate the individual subsets of points of the constellation and the corresponding code rate for the respective levels of the hierarchical partitioning based on the AWGN metric and phase noise metric indicated by the UE 115-*c*. Additionally, or alternatively, the network entity 105-*c* may select the individual subsets of points of the constellation and the corresponding code rate for the respective levels of the hierarchical partitioning from a predefined list. The network entity 105-*c* may design the mapping of the hierarchical partitioning such that the spectral efficiency of the MCS may satisfy a threshold value. For instance, the individual subsets of the plurality of subsets of points may be based on Euclidean distances between points in the constellation such the Euclidian distance for a subset of points satisfies a threshold value in the presence of the AWGN metric and phase noise metric indicated by the UE 115-*c*. In some examples, the hierarchical partitioning may be an example of a QAM MLC scheme.

At 520, the UE 115-*c* may receive, based on transmitting the noise indication message, a second control information that indicates a set of partitioning parameters. In some examples, the set of partitioning parameters may be indicative of the hierarchical partitioning identified by the network entity 105-*c*. In some examples, the second control information may be DCI that is transmitted in a DCI message.

At 525, the UE 115-*c* may identify the hierarchical partitioning from the set of partitioning parameters. For example, the UE 115-*c* may determine, from the set of partitioning parameters, the mapping between individual subsets of points of the constellation and respective levels of the hierarchical partitioning and the corresponding code rate for each of the respective levels of the hierarchical partitioning. In some examples, the code rate for each level of the hierarchical partitioning is included in the set of partitioning parameters (e.g., the network entity 105-*c* transmits to the UE 115-*c* an indication of the respective code rates for each level as part of the partitioning parameters, at 520). Additionally or alternatively, the network entity 105-*c* may transmit to the UE 115-*c* an indication of the corresponding code rate for each level in separate signaling (e.g., as part of a third control information different than the second control information).

At 530, the network entity 105-*c* may encode a message using the hierarchical partitioning. For example, the network entity 105-*c* may encode the message in accordance with the mapping associated with the set of partitioning parameters. In some examples, the encoded message may include an encoded sequence of bit values from the respective candidate sequence of bit values, where each respective level of the hierarchical partitioning may be associated with a value of one bit for each of one or more points of the constellation.

At 535, the network entity 105-*c* may transmit the encoded message to the UE 115-*c*.

At 540, the UE 115-*c* may decode the message (e.g., modulated via the MCS) using the identified hierarchical partitioning. For example, the UE 115-*c* may identify that the message includes an encoded sequence of bit values from the respective candidate sequence of bit values. In some examples, the UE 115-*c* may use each respective level of the hierarchical partitioning to determine a value of one bit for each of one or more received points of the constellation. For example, the UE 115-*c* may decode a first bit for each of the one or more received points of the constellation using a first subset of points of the constellation and a first code rate associated with a first level of the hierarchical partitioning. As such, the UE 115-*c* may decode a second bit for each of the one or more received points of the constellation using a second subset of points of the constellation and a second code rate associated with a second level of the hierarchical partitioning. In some examples, the second subset of points is a subset of the first subset of points. The UE 115-*c* may continue to decode each bit value of each respective bit sequence associated with each received constellation point using the subset of points and code rate associated with each level of the hierarchical partitioning.

Figure 6:
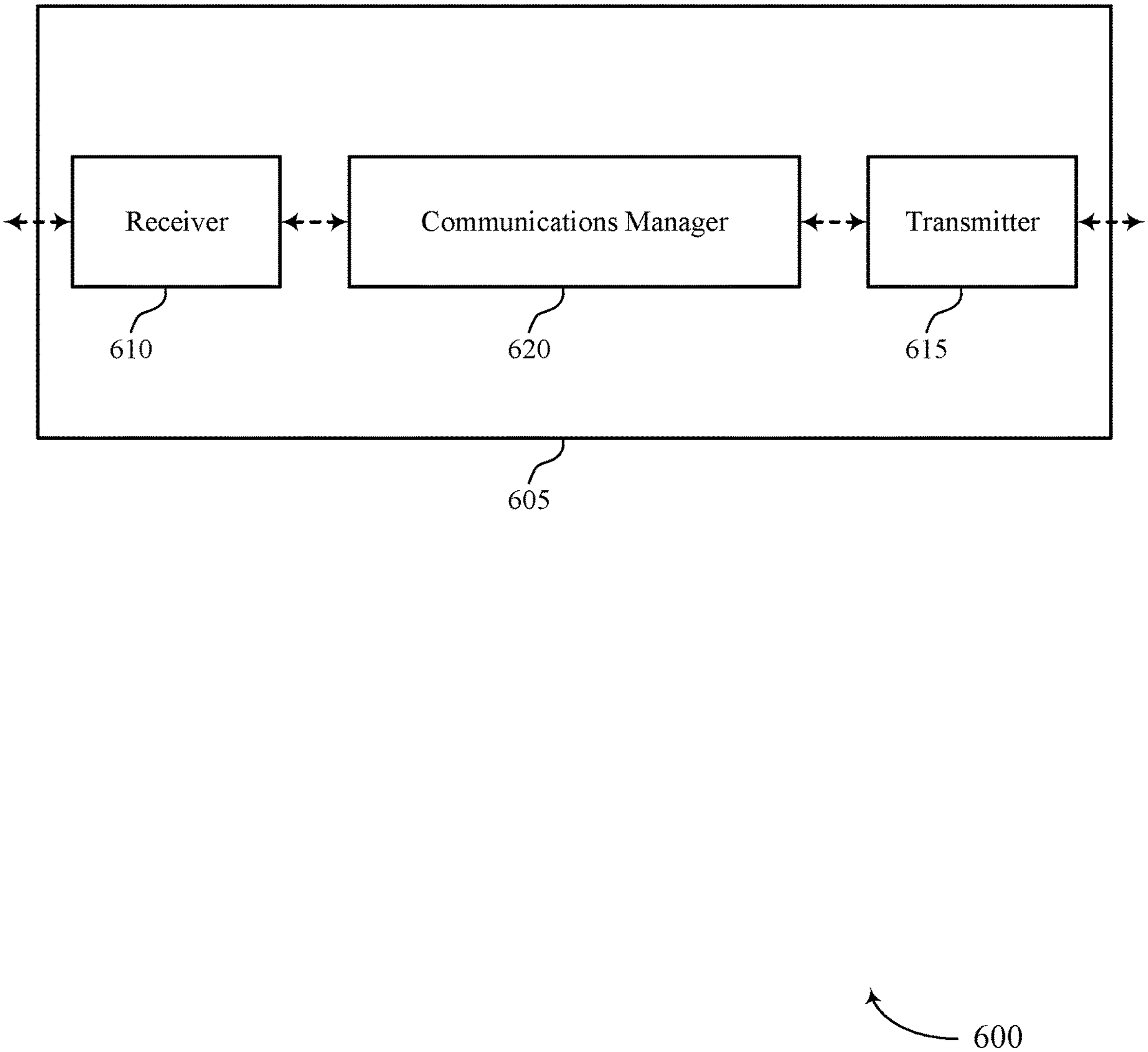
FIGS. 6 and 7 show block diagrams of devices that support set partitioning for channels associated with phase noise in accordance with one or more aspects of the present disclosure.

FIG. 6 shows a block diagram 600 of a device 605 that supports set partitioning for channels associated with phase noise in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to set partitioning for channels associated with phase noise). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to set partitioning for channels associated with phase noise). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of set partitioning for channels associated with phase noise as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for transmitting first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase. The communications manager 620 is capable of, configured to, or operable to support a means for receiving, based on transmitting the first control information, second control information that indicates a set of partitioning parameters, where the set of partitioning parameters is indicative of a hierarchical partitioning of the constellation into a set of multiple subsets of points. The communications manager 620 is capable of, configured to, or operable to support a means for decoding a message modulated via the MCS, where the decoding is hierarchical based on the set of multiple subsets of points.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a more robust encoding and decoding of QAM signaling resulting in reduced processing, reduced power consumption, more efficient utilization of communication resources, and increased spectral efficiency.

Figure 7:
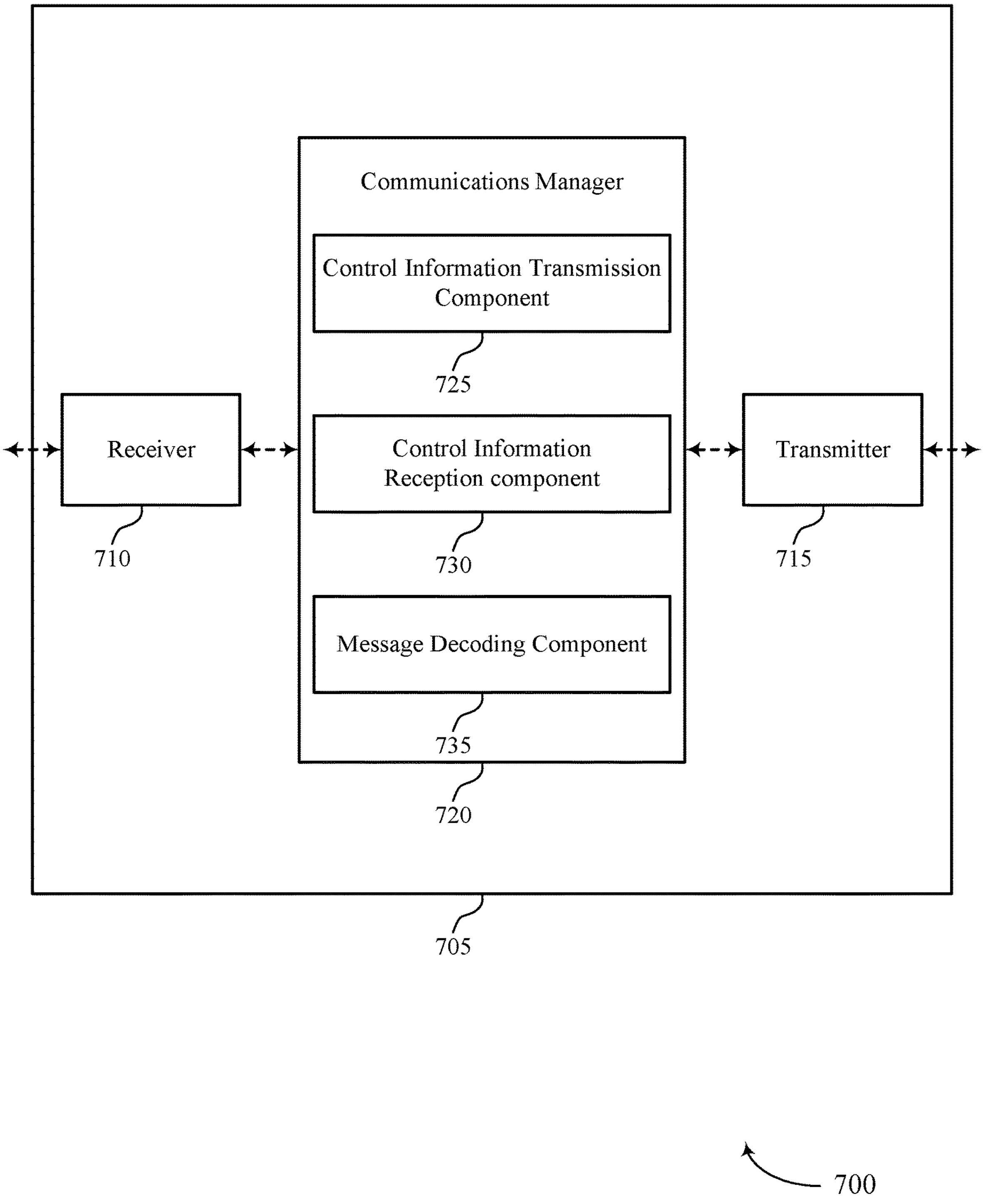

FIG. 7 shows a block diagram 700 of a device 705 that supports set partitioning for channels associated with phase noise in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to set partitioning for channels associated with phase noise). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to set partitioning for channels associated with phase noise). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of set partitioning for channels associated with phase noise as described herein. For example, the communications manager 720 may include a control information transmission component 725, a control information reception component 730, a message decoding component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The control information transmission component 725 is capable of, configured to, or operable to support a means for transmitting first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase. The control information reception component 730 is capable of, configured to, or operable to support a means for receiving, based on transmitting the first control information, second control information that indicates a set of partitioning parameters, where the set of partitioning parameters is indicative of a hierarchical partitioning of the constellation into a set of multiple subsets of points. The message decoding component 735 is capable of, configured to, or operable to support a means for decoding a message modulated via the MCS, where the decoding is hierarchical based on the set of multiple subsets of points.

Figure 8:
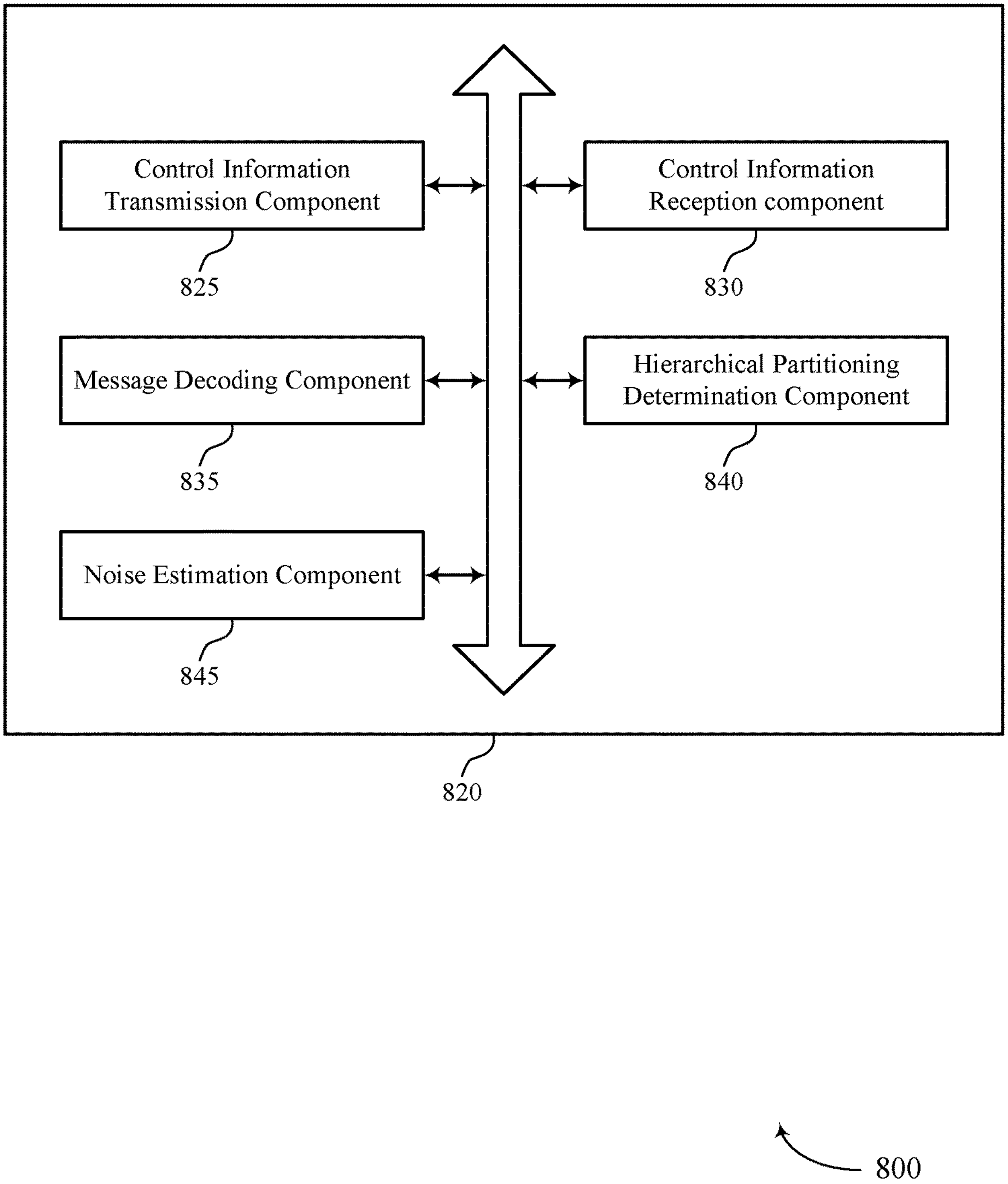
FIG. 8 shows a block diagram of a communications manager that supports set partitioning for channels associated with phase noise in accordance with one or more aspects of the present disclosure.

FIG. 8 shows a block diagram 800 of a communications manager 820 that supports set partitioning for channels associated with phase noise in accordance with one or more aspects of the present disclosure. The communications manager 820 may be an example of aspects of a communications manager 620, a communications manager 720, or both, as described herein. The communications manager 820, or various components thereof, may be an example of means for performing various aspects of set partitioning for channels associated with phase noise as described herein. For example, the communications manager 820 may include a control information transmission component 825, a control information reception component 830, a message decoding component 835, a hierarchical partitioning determination component 840, a noise estimation component 845, or any combination thereof. Each of these components may communicate, directly or indirectly, with one another (e.g., via one or more buses).

The communications manager 820 may support wireless communications in accordance with examples as disclosed herein. The control information transmission component 825 is capable of, configured to, or operable to support a means for transmitting first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase. The control information reception component 830 is capable of, configured to, or operable to support a means for receiving, based on transmitting the first control information, second control information that indicates a set of partitioning parameters, where the set of partitioning parameters is indicative of a hierarchical partitioning of the constellation into a set of multiple subsets of points. The message decoding component 835 is capable of, configured to, or operable to support a means for decoding a message modulated via the MCS, where the decoding is hierarchical based on the set of multiple subsets of points.

In some examples, the hierarchical partitioning determination component 840 is capable of, configured to, or operable to support a means for determining, based on the set of partitioning parameters, a mapping between individual subsets of points of the constellation and respective levels of the hierarchical partitioning, each of the respective levels of the hierarchical partitioning also associated with a corresponding code rate included in the set of partitioning parameters or received in a third control information.

In some examples, to support decoding the message, the hierarchical partitioning determination component 840 is capable of, configured to, or operable to support a means for identifying that the message includes an encoded sequence of bit values from the respective candidate sequence of bit values, where each respective level of the hierarchical partitioning is used to determine a value of one bit for each of one or more received points of the constellation.

In some examples, the message decoding component 835 is capable of, configured to, or operable to support a means for decoding a first bit for each of the one or more received points of the constellation using a first subset of points of the constellation and a first code rate associated with a first level of the hierarchical partitioning. In some examples, the message decoding component 835 is capable of, configured to, or operable to support a means for decoding a second bit for each of the one or more received points of the constellation using a second subset of points of the constellation and a second code rate associated with a second level of the hierarchical partitioning, where the second subset of points is a subset of the first subset of points.

In some examples, the mapping results in the spectral efficiency of the MCS satisfying a threshold value.

In some examples, the noise estimation component 845 is capable of, configured to, or operable to support a means for estimating an AWGN metric and a phase noise metric associated with the UE, where the first control information that is indicative of noise includes an indication of the AWGN metric and the phase noise metric.

In some examples, individual subsets of the set of multiple subsets of points are based on Euclidean distances between points in the constellation. In some examples, the Euclidean distances are based on the noise indicated in the first control information.

In some examples, the MCS is associated with QAM and the hierarchical partitioning includes a QAM MLC.

In some examples, the first control information is included in an UCI message and the second control information is included in a DCI message.

Figure 9:
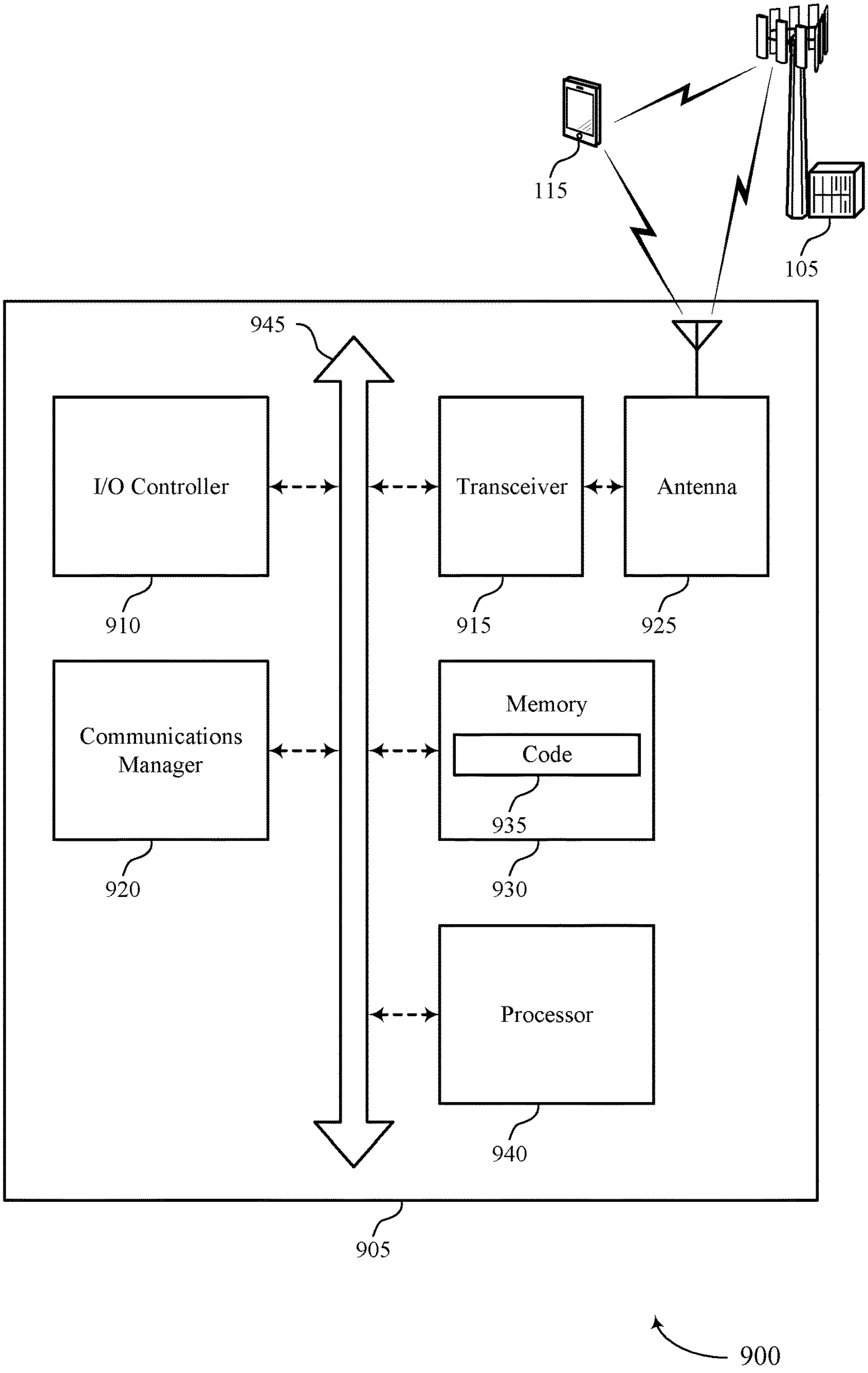
FIG. 9 shows a diagram of a system including a device that supports set partitioning for channels associated with phase noise in accordance with one or more aspects of the present disclosure.

FIG. 9 shows a diagram of a system 900 including a device 905 that supports set partitioning for channels associated with phase noise in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting set partitioning for channels associated with phase noise). For example, the device 905 or a component of the device 905 may include a processor 940 and memory 930 coupled with or to the processor 940, the processor 940 and memory 930 configured to perform various functions described herein.

The communications manager 920 may support wireless communications in accordance with examples as disclosed herein. For example, the communications manager 920 is capable of, configured to, or operable to support a means for transmitting first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase. The communications manager 920 is capable of, configured to, or operable to support a means for receiving, based on transmitting the first control information, second control information that indicates a set of partitioning parameters, where the set of partitioning parameters is indicative of a hierarchical partitioning of the constellation into a set of multiple subsets of points. The communications manager 920 is capable of, configured to, or operable to support a means for decoding a message modulated via the MCS, where the decoding is hierarchical based on the set of multiple subsets of points.

By including or configuring the communications manager 920 in accordance with examples as described herein, the device 905 may support techniques for a more robust encoding and decoding of QAM signaling resulting in improved communication reliability, reduced latency, improved user experience related to reduced processing, reduced power consumption, more efficient utilization of communication resources, improved coordination between devices, improved utilization of processing capability, and increased spectral efficiency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of set partitioning for channels associated with phase noise as described herein, or the processor 940 and the memory 930 may be otherwise configured to perform or support such operations.

Figure 10:
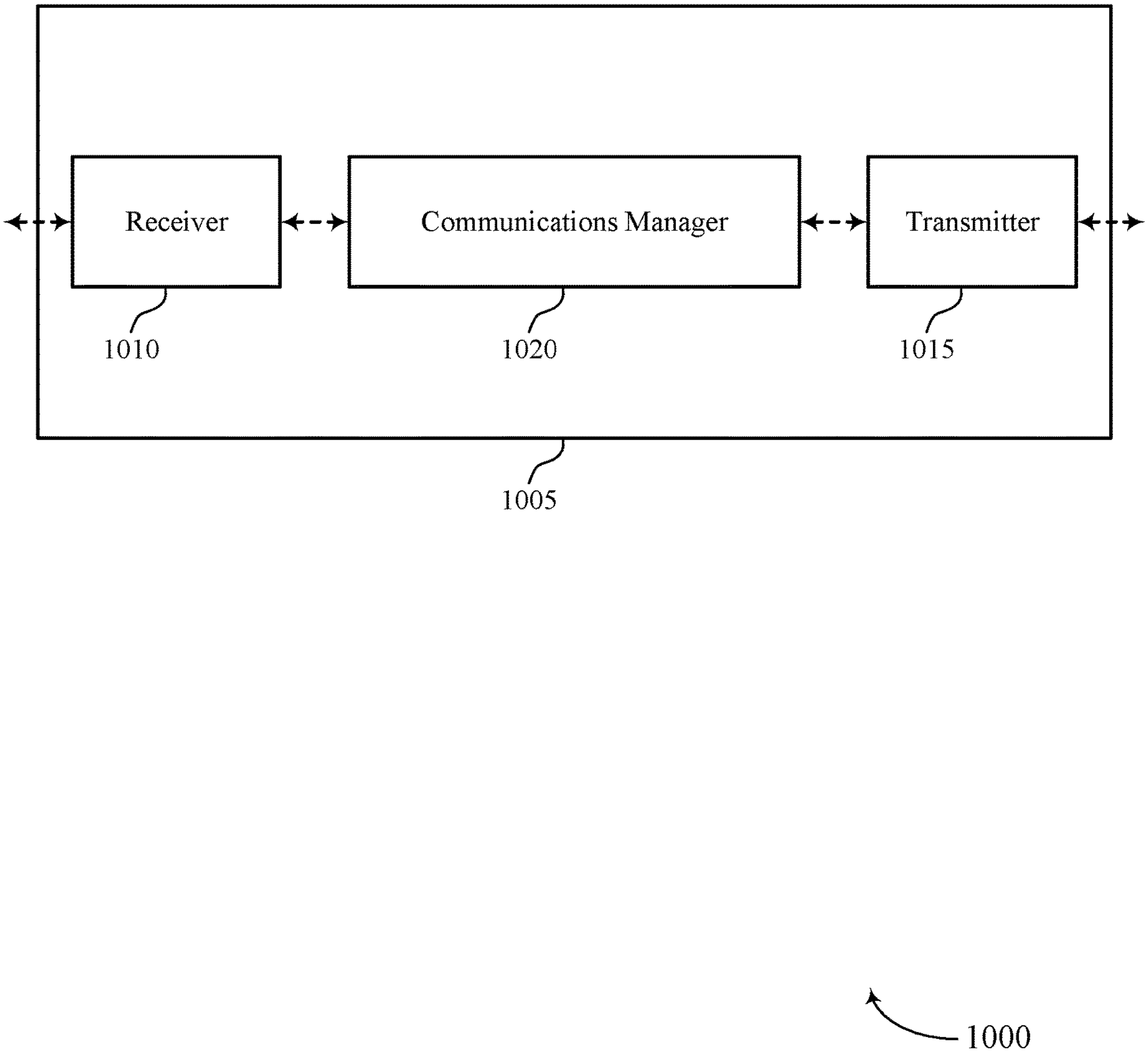
FIGS. 10 and 11 show block diagrams of devices that support set partitioning for channels associated with phase noise in accordance with one or more aspects of the present disclosure.

FIG. 10 shows a block diagram 1000 of a device 1005 that supports set partitioning for channels associated with phase noise in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of set partitioning for channels associated with phase noise as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase. The communications manager 1020 is capable of, configured to, or operable to support a means for transmitting, based on transmitting the first control information, second control information that indicates a set of partitioning parameters, where the set of partitioning parameters is indicative of a hierarchical partitioning of the constellation into a set of multiple subsets of points. The communications manager 1020 is capable of, configured to, or operable to support a means for transmitting a message via the MCS, where decoding the message is hierarchical based on the set of multiple subsets of points.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for a more robust encoding and decoding of QAM signaling resulting in reduced processing, reduced power consumption, more efficient utilization of communication resources, and increased spectral efficiency.

Figure 11:
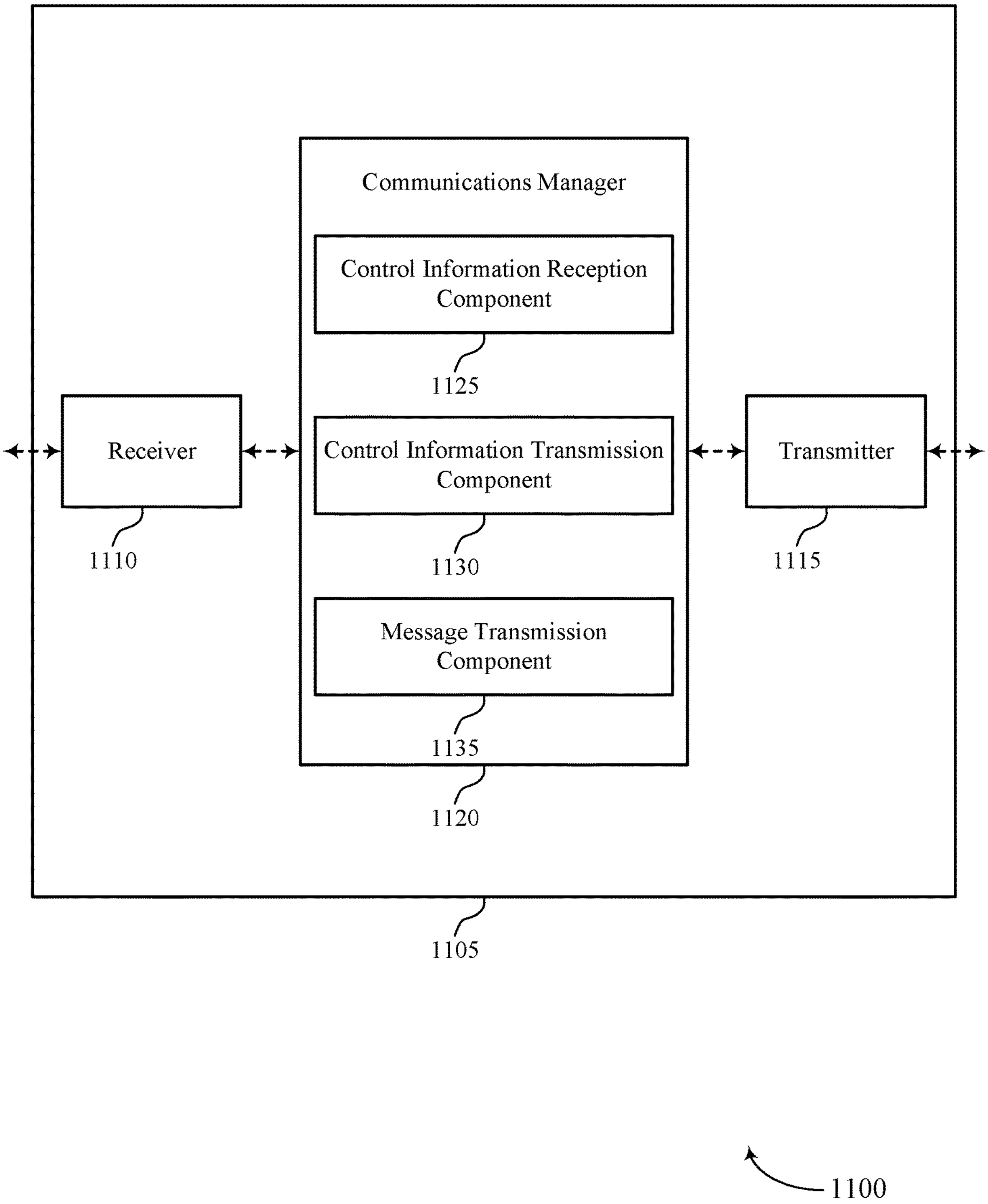

FIG. 11 shows a block diagram 1100 of a device 1105 that supports set partitioning for channels associated with phase noise in accordance with one or more aspects of the present disclosure. The device 1105 may be an example of aspects of a device 1005 or a network entity 105 as described herein.

The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of set partitioning for channels associated with phase noise as described herein. For example, the communications manager 1120 may include a control information reception component 1125, a control information transmission component 1130, a message transmission component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The control information reception component 1125 is capable of, configured to, or operable to support a means for receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase. The control information transmission component 1130 is capable of, configured to, or operable to support a means for transmitting, based on transmitting the first control information, second control information that indicates a set of partitioning parameters, where the set of partitioning parameters is indicative of a hierarchical partitioning of the constellation into a set of multiple subsets of points. The message transmission component 1135 is capable of, configured to, or operable to support a means for transmitting a message via the MCS, where decoding the message is hierarchical based on the set of multiple subsets of points.

Figure 12:
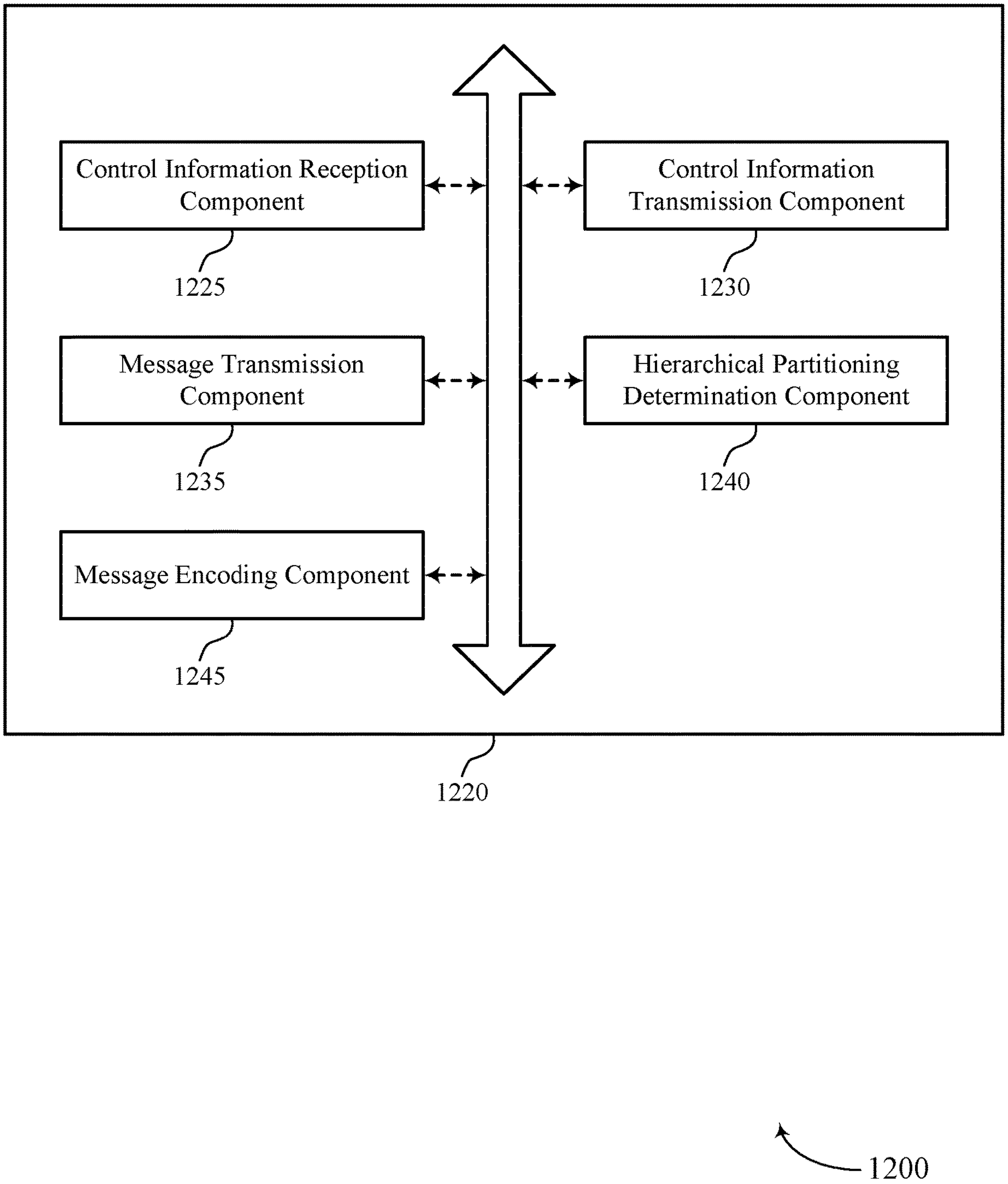
FIG. 12 shows a block diagram of a communications manager that supports set partitioning for channels associated with phase noise in accordance with one or more aspects of the present disclosure.

FIG. 12 shows a block diagram 1200 of a communications manager 1220 that supports set partitioning for channels associated with phase noise in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of set partitioning for channels associated with phase noise as described herein. For example, the communications manager 1220 may include a control information reception component 1225, a control information transmission component 1230, a message transmission component 1235, a hierarchical partitioning determination component 1240, a message encoding component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The control information reception component 1225 is capable of, configured to, or operable to support a means for receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase. The control information transmission component 1230 is capable of, configured to, or operable to support a means for transmitting, based on transmitting the first control information, second control information that indicates a set of partitioning parameters, where the set of partitioning parameters is indicative of a hierarchical partitioning of the constellation into a set of multiple subsets of points. The message transmission component 1235 is capable of, configured to, or operable to support a means for transmitting a message via the MCS, where decoding the message is hierarchical based on the set of multiple subsets of points.

In some examples, the hierarchical partitioning determination component 1240 is capable of, configured to, or operable to support a means for mapping between individual subsets of points of the constellation and respective levels of the hierarchical partitioning, each of the respective levels of the hierarchical partitioning also associated with a corresponding code rate indicated to the UE via comprised in the set of partitioning parameters or via transmitted in a third control information.

In some examples, the message encoding component 1245 is capable of, configured to, or operable to support a means for encoding, via the MCS, the message in accordance with the mapping associated with the set of partitioning parameters and the corresponding code rate for each of the respective levels of the hierarchical partitioning, the encoded message including an encoded sequence of bit values from the respective candidate sequence of bit values, where each respective level of the hierarchical partitioning is associated with a value of one bit for each of one or more points of the constellation.

In some examples, to support mapping, the hierarchical partitioning determination component 1240 is capable of, configured to, or operable to support a means for generating the individual subsets of points of the constellation and the corresponding code rate for the respective levels of the hierarchical partitioning such that the spectral efficiency of the MCS satisfies a configured threshold.

In some examples, to support mapping, the hierarchical partitioning determination component 1240 is capable of, configured to, or operable to support a means for selecting, from a predefined list, the individual subsets of points of the constellation and the corresponding code rate for the respective levels of the hierarchical partitioning such that the spectral efficiency of the MCS satisfies a configured threshold.

In some examples, to support receiving the first control information that is indicative of noise, the control information reception component 1225 is capable of, configured to, or operable to support a means for receiving an indication of an AWGN metric and a phase noise metric associated with the UE, where the set of partitioning parameters are based on the AWGN metric and a phase noise metric.

In some examples, individual subsets of the set of multiple subsets of points are based on Euclidean distances between points in the constellation. In some examples, the Euclidean distances are based on the noise indicated in the first control information.

In some examples, the MCS is associated with a QAM scheme and the hierarchical partitioning includes a QAM MLC.

In some examples, the first control information is included in an UCI message and the second control information is included in a DCI message.

Figure 13:
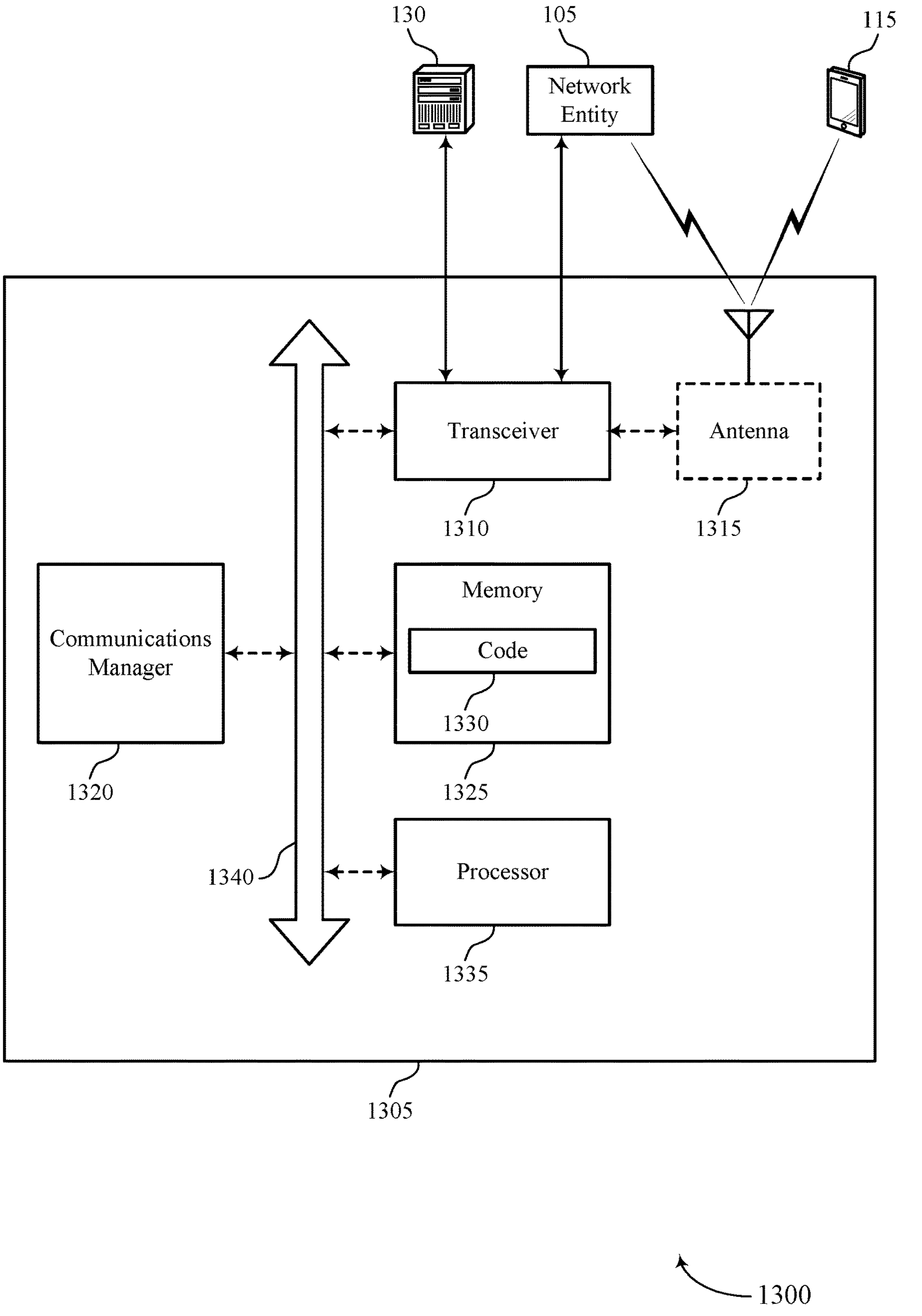
FIG. 13 shows a diagram of a system including a device that supports set partitioning for channels associated with phase noise in accordance with one or more aspects of the present disclosure.

FIG. 13 shows a diagram of a system 1300 including a device 1305 that supports set partitioning for channels associated with phase noise in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting set partitioning for channels associated with phase noise). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase. The communications manager 1320 is capable of, configured to, or operable to support a means for transmitting, based on transmitting the first control information, second control information that indicates a set of partitioning parameters, where the set of partitioning parameters is indicative of a hierarchical partitioning of the constellation into a set of multiple subsets of points. The communications manager 1320 is capable of, configured to, or operable to support a means for transmitting a message via the MCS, where decoding the message is hierarchical based on the set of multiple subsets of points.

By including or configuring the communications manager 1320 in accordance with examples as described herein, the device 1305 may support techniques for a more robust encoding and decoding of QAM signaling resulting in improved communication reliability, reduced latency, improved user experience related to reduced processing, reduced power consumption, more efficient utilization of communication resources, improved coordination between devices, improved utilization of processing capability, and increased spectral efficiency.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of set partitioning for channels associated with phase noise as described herein, or the processor 1335 and the memory 1325 may be otherwise configured to perform or support such operations.

Figure 14:
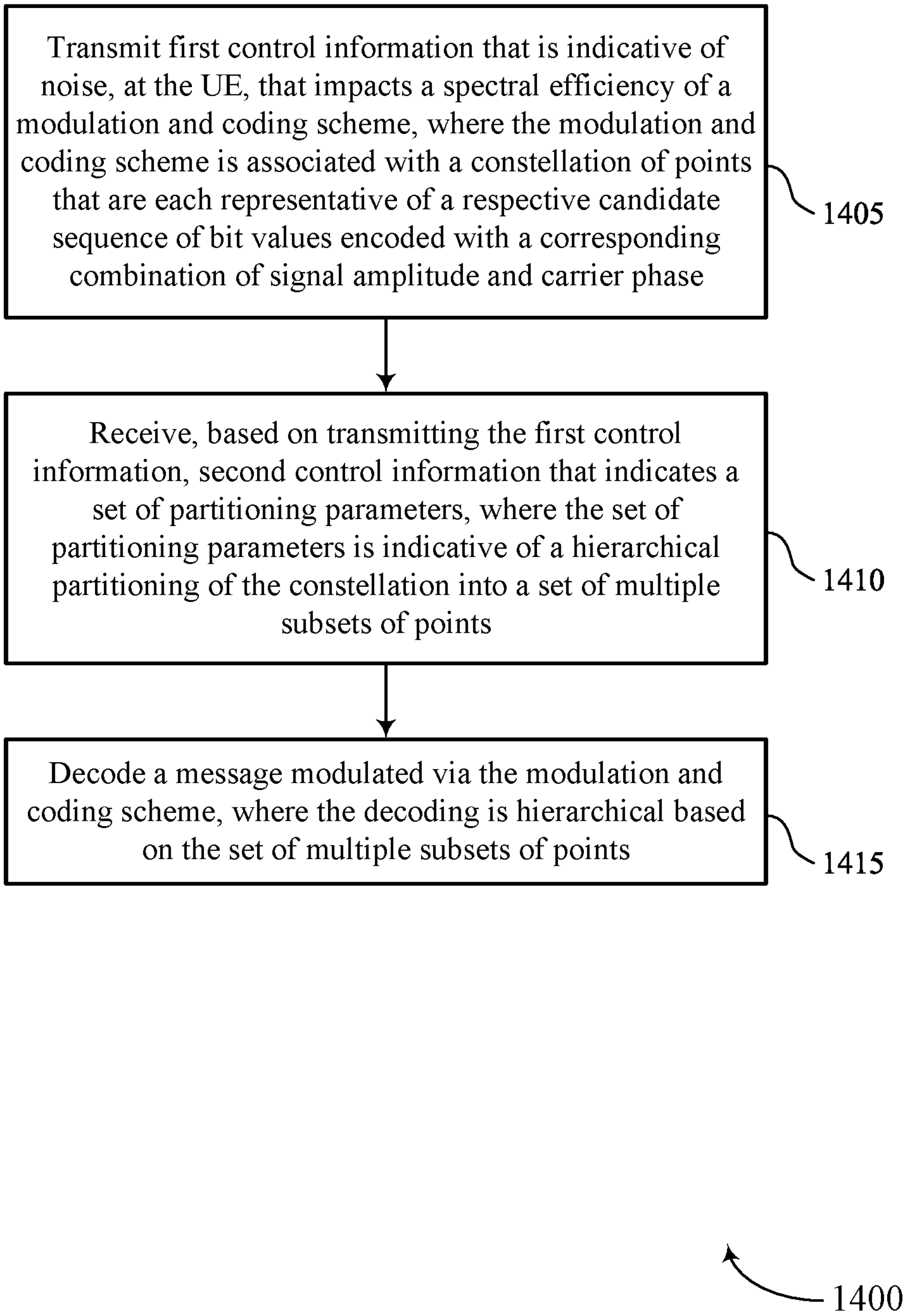
FIGS. 14 through 17 show flowcharts illustrating methods that support set partitioning for channels associated with phase noise in accordance with one or more aspects of the present disclosure.

FIG. 14 shows a flowchart illustrating a method 1400 that supports set partitioning for channels associated with phase noise in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include transmitting first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase. The operations of 1405 may be performed in accordance with examples as disclosed herein. In some examples, aspects of the operations of 1405 may be performed by a control information transmission component 825 as described with reference to FIG. 8.

At 1410, the method may include receiving, based on transmitting the first control information, second control information that indicates a set of partitioning parameters, where the set of partitioning parameters is indicative of a hierarchical partitioning of the constellation into a set of multiple subsets of points. The operations of 1410 may be performed in accordance with examples as disclosed herein. In some examples, aspects of the operations of 1410 may be performed by a control information reception component 830 as described with reference to FIG. 8.

At 1415, the method may include decoding a message modulated via the MCS, where the decoding is hierarchical based on the set of multiple subsets of points. The operations of 1415 may be performed in accordance with examples as disclosed herein. In some examples, aspects of the operations of 1415 may be performed by a message decoding component 835 as described with reference to FIG. 8.

Figure 15:
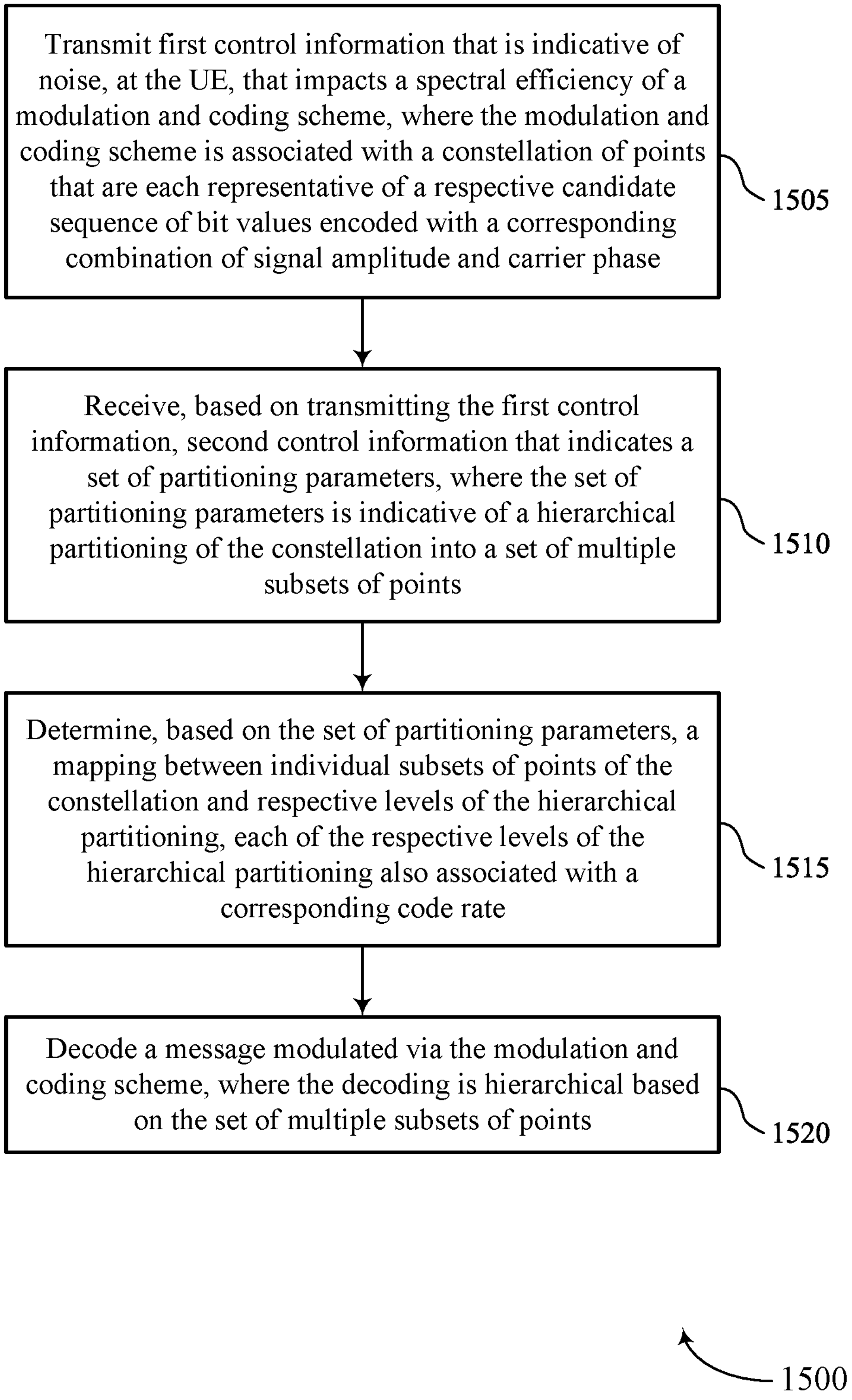

FIG. 15 shows a flowchart illustrating a method 1500 that supports set partitioning for channels associated with phase noise in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1505, the method may include transmitting first control information that is indicative of noise, at the UE, that impacts a spectral efficiency of a MCS, where the MCS is associated with a constellation of points that are each representative of a respective candidate sequence of bit values encoded with a corresponding combination of signal amplitude and carrier phase. The operations of 1505 may be performed in accordance with examples as disclosed herein. In some examples, aspects of the operations of 1505 may be performed by a control information transmission component 825 as described with reference to FIG. 8.

At 1510, the method may include receiving, based on transmitting the first control information, second control information that indicates a set of partitioning parameters, where the set of partitioning parameters is indicative of a hierarchical partitioning of the constellation into a set of multiple subsets of points. The operations of 1510 may be performed in accordance with examples as disclosed herein. In some examples, aspects of the operations of 1510 may be performed by a control information reception component 830 as described with reference to FIG. 8.

At 1515, the method may include determining, based on the set of partitioning parameters, a mapping between individual subsets of points of the constellation and respective levels of the hierarchical partitioning, each of the respective levels of the hierarchical partitioning also associated with a corresponding code rate included in the set of partitioning parameters or received in a third control information. The operations of 1515 may be performed in accordance with examples as disclosed herein. In some examples, aspects of the operations of 1515 may be performed by a hierarchical partitioning determination component 840 as described with reference to FIG. 8.

At 1520, the method may include decoding a message modulated via the MCS, where the decoding is hierarchical based on the set of multiple subsets of points. The operations of 1520 may be performed in accordance with examples as disclosed herein. In some examples, aspects of the operations of 1520 may be performed by a message decoding component 835 as described with reference to FIG. 8.

Figure 16:
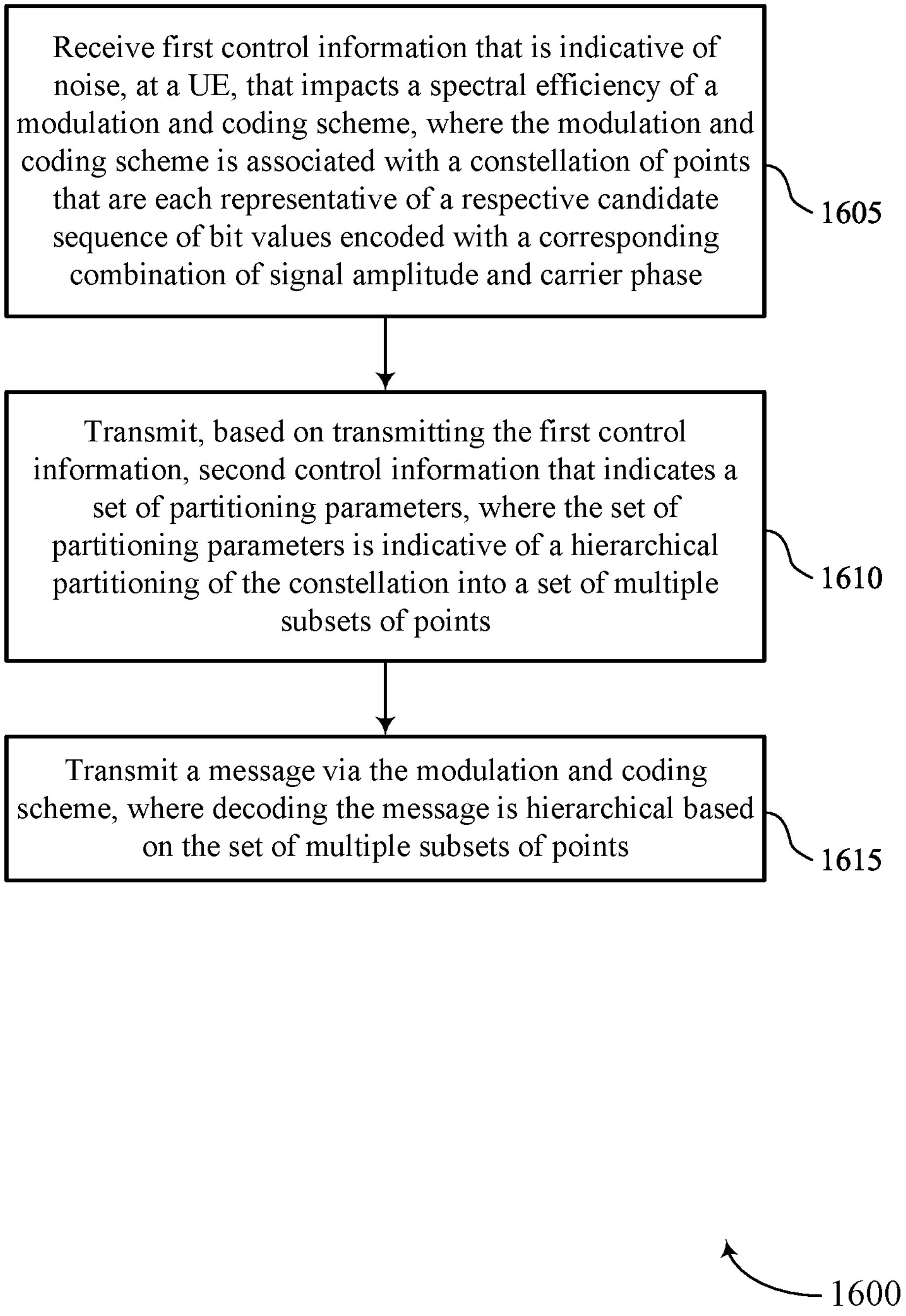

FIG. 16 shows a flowchart illustrating a method 1600 that supports set partitioning for channels associated with phase noise in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase. The operations of 1605 may be performed in accordance with examples as disclosed herein. In some examples, aspects of the operations of 1605 may be performed by a control information reception component 1225 as described with reference to FIG. 12.

At 1610, the method may include transmitting, based on transmitting the first control information, second control information that indicates a set of partitioning parameters, where the set of partitioning parameters is indicative of a hierarchical partitioning of the constellation into a set of multiple subsets of points. The operations of 1610 may be performed in accordance with examples as disclosed herein. In some examples, aspects of the operations of 1610 may be performed by a control information transmission component 1230 as described with reference to FIG. 12.

At 1615, the method may include transmitting a message via the MCS, where decoding the message is hierarchical based on the set of multiple subsets of points. The operations of 1615 may be performed in accordance with examples as disclosed herein. In some examples, aspects of the operations of 1615 may be performed by a message transmission component 1235 as described with reference to FIG. 12.

Figure 17:
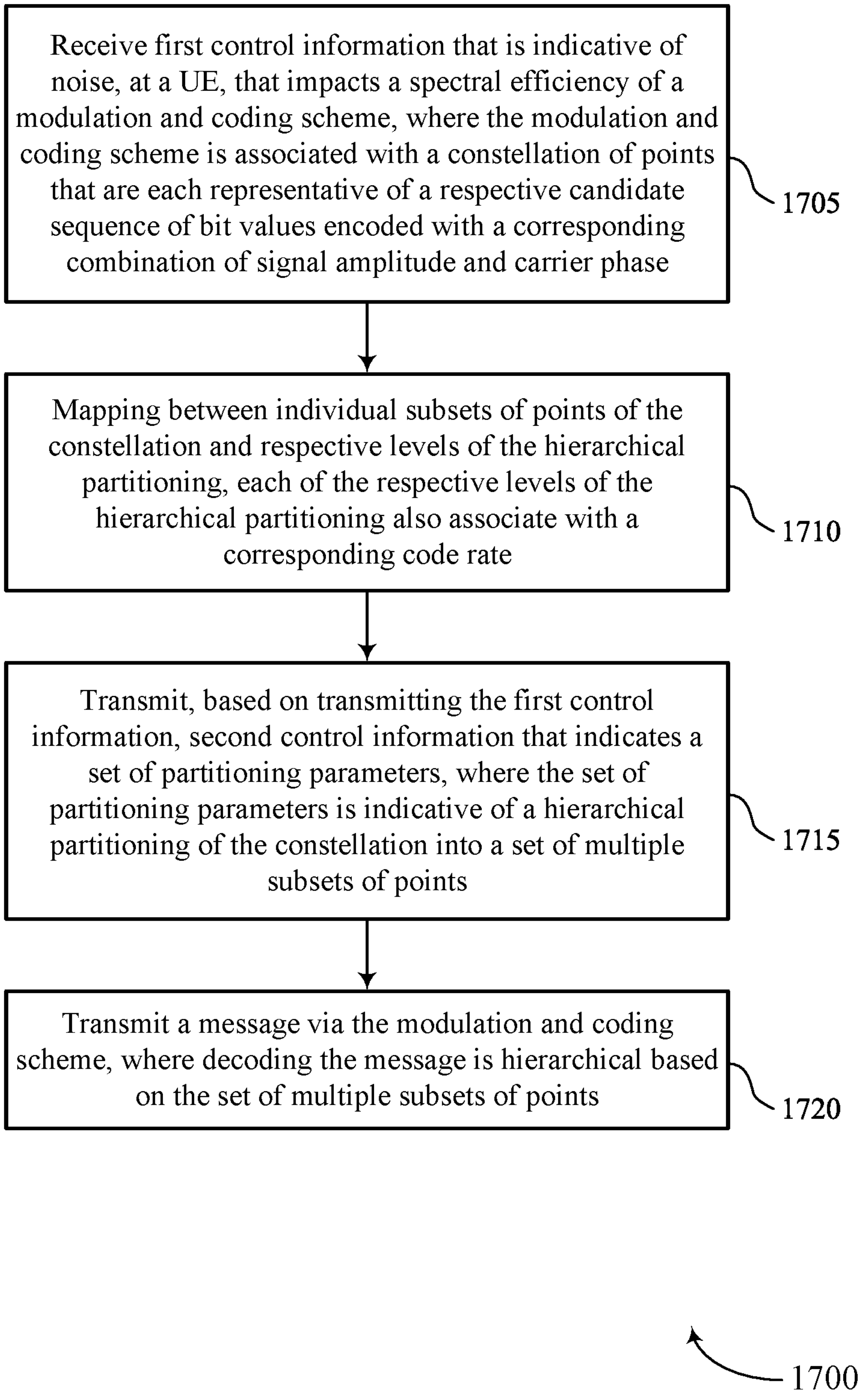

FIG. 17 shows a flowchart illustrating a method 1700 that supports set partitioning for channels associated with phase noise in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include receiving first control information that is indicative of noise, at a UE, that impacts a spectral efficiency of a MCS, where the MCS is associated with a constellation of points that are each representative of a respective candidate sequence of bit values encoded with a corresponding combination of signal amplitude and carrier phase. The operations of 1705 may be performed in accordance with examples as disclosed herein. In some examples, aspects of the operations of 1705 may be performed by a control information reception component 1225 as described with reference to FIG. 12.

At 1710, the method may include mapping between individual subsets of points of the constellation and respective levels of the hierarchical partitioning, each of the respective levels of the hierarchical partitioning also associated with a corresponding code rate indicated to the UE via comprised in the set of partitioning parameters or via transmitted in a third control information. The operations of 1710 may be performed in accordance with examples as disclosed herein. In some examples, aspects of the operations of 1710 may be performed by a hierarchical partitioning determination component 1240 as described with reference to FIG. 12.

At 1715, the method may include transmitting, based on transmitting the first control information, second control information that indicates a set of partitioning parameters, where the set of partitioning parameters is indicative of a hierarchical partitioning of the constellation into a set of multiple subsets of points. The operations of 1715 may be performed in accordance with examples as disclosed herein. In some examples, aspects of the operations of 1715 may be performed by a control information transmission component 1230 as described with reference to FIG. 12.

At 1720, the method may include transmitting a message via the MCS, where decoding the message is hierarchical based on the set of multiple subsets of points. The operations of 1720 may be performed in accordance with examples as disclosed herein. In some examples, aspects of the operations of 1720 may be performed by a message transmission component 1235 as described with reference to FIG. 12.

The following provides an overview of aspects of the present disclosure:

Aspect 1: A method for wireless communications, at a UE comprising: transmitting first control information that is indicative of noise, at the UE, that impacts a spectral efficiency of a MCS, wherein the MCS is associated with a constellation of points that are each representative of a respective candidate sequence of bit values encoded with a corresponding combination of signal amplitude and carrier phase; receiving, based at least in part on transmitting the first control information, second control information that indicates a set of partitioning parameters, wherein the set of partitioning parameters is indicative of a hierarchical partitioning of the constellation into a plurality of subsets of points; and decoding a message modulated via the MCS, wherein the decoding is hierarchical based at least in part on the plurality of subsets of points.

Aspect 2: The method of aspect 1, further comprising: determining, based at least in part on the set of partitioning parameters, a mapping between individual subsets of points of the constellation and respective levels of the hierarchical partitioning, each of the respective levels of the hierarchical partitioning also associated with a corresponding code rate comprised in the set of partitioning parameters or received in a third control information.

Aspect 3: The method of aspect 2, wherein decoding the message comprises: identifying that the message includes an encoded sequence of bit values from the respective candidate sequence of bit values, wherein each respective level of the hierarchical partitioning is used to determine a value of one bit for each of one or more received points of the constellation.

Aspect 4: The method of aspect 3, further comprising: decoding a first bit for each of the one or more received points of the constellation using a first subset of points of the constellation and a first code rate associated with a first level of the hierarchical partitioning; and decoding a second bit for each of the one or more received points of the constellation using a second subset of points of the constellation and a second code rate associated with a second level of the hierarchical partitioning, wherein the second subset of points is a subset of the first subset of points.

Aspect 5: The method of any of aspects 2 through 4, wherein the mapping results in the spectral efficiency of the MCS satisfying a threshold value.

Aspect 6: The method of any of aspects 1 through 5, further comprising: estimating an AWGN metric and a phase noise metric associated with the UE, wherein the first control information that is indicative of noise comprises an indication of the AWGN metric and the phase noise metric.

Aspect 7: The method of any of aspects 1 through 6, wherein individual subsets of the plurality of subsets of points are based at least in part on Euclidean distances between points in the constellation, the Euclidean distances are based at least in part on the noise indicated in the first control information.

Aspect 8: The method of any of aspects 1 through 7, wherein the MCS is associated with QAM and the hierarchical partitioning comprises a QAM MLC.

Aspect 9: The method of any of aspects 1 through 8, wherein the first control information is included in an UCI message and the second control information is included in a DCI message.

Aspect 10: A method for wireless communications, at a network entity, comprising: receiving first control information that is indicative of noise, at a UE, that impacts a spectral efficiency of a MCS, wherein the MCS is associated with a constellation of points that are each representative of a respective candidate sequence of bit values encoded with a corresponding combination of signal amplitude and carrier phase; transmitting, based at least in part on transmitting the first control information, second control information that indicates a set of partitioning parameters, wherein the set of partitioning parameters is indicative of a hierarchical partitioning of the constellation into a plurality of subsets of points; and transmitting a message via the MCS, wherein decoding the message is hierarchical based at least in part on the plurality of subsets of points.

Aspect 11: The method of aspect 10, further comprising: mapping between individual subsets of points of the constellation and respective levels of the hierarchical partitioning, each of the respective levels of the hierarchical partitioning also associated with a corresponding code rate indicated to the UE via the set of partitioning parameters or via a third control information.

Aspect 12: The method of aspect 11, further comprising: encoding, via the MCS, the message in accordance with the mapping associated with the set of partitioning parameters and the corresponding code rate for each of the respective levels of the hierarchical partitioning, the encoded message comprising an encoded sequence of bit values from the respective candidate sequence of bit values, wherein each respective level of the hierarchical partitioning is associated with a value of one bit for each of one or more points of the constellation.

Aspect 13: The method of any of aspects 11 through 12, wherein the mapping further comprises: generating the individual subsets of points of the constellation and the corresponding code rate for the respective levels of the hierarchical partitioning such that the spectral efficiency of the MCS satisfies a configured threshold.

Aspect 14: The method of any of aspects 11 through 13, wherein the mapping further comprises: selecting, from a predefined list, the individual subsets of points of the constellation and the corresponding code rate for the respective levels of the hierarchical partitioning such that the spectral efficiency of the MCS satisfies a configured threshold.

Aspect 15: The method of any of aspects 10 through 14, wherein receiving the first control information that is indicative of noise comprises: receiving an indication of an AWGN metric and a phase noise metric associated with the UE, wherein the set of partitioning parameters are based at least in part on the AWGN metric and a phase noise metric.

Aspect 16: The method of any of aspects 10 through 15, wherein individual subsets of the plurality of subsets of points are based at least in part on Euclidean distances between points in the constellation, the Euclidean distances are based at least in part on the noise indicated in the first control information.

Aspect 17: The method of any of aspects 10 through 16, wherein the MCS is associated with a QAM scheme and the hierarchical partitioning comprises a QAM MLC.

Aspect 18: The method of any of aspects 10 through 17, wherein the first control information is included in an UCI message and the second control information is included in a DCI message.

Aspect 19: An apparatus for wireless communications, comprising a processor; memory coupled with the processor; and instructions stored in the memory and executable by the processor to cause the apparatus to perform a method of any of aspects 1 through 9.

Aspect 20: An apparatus for wireless communications, comprising at least one means for performing a method of any of aspects 1 through 9.

Aspect 21: A non-transitory computer-readable medium storing code for wireless communications, the code comprising instructions executable by a processor to perform a method of any of aspects 1 through 9.

Aspect 22: An apparatus for wireless communications, comprising a processor; memory coupled with the processor; and instructions stored in the memory and executable by the processor to cause the apparatus to perform a method of any of aspects 10 through 18.

Aspect 23: An apparatus for wireless communications, comprising at least one means for performing a method of any of aspects 10 through 18.

Aspect 24: A non-transitory computer-readable medium storing code for wireless communications, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
- a processor;
- memory coupled with the processor; and
- instructions stored in the memory and executable by the processor to cause the apparatus to:
  - transmit first control information that is indicative of an additive white gaussian noise metric and a phase noise metric, at the apparatus, that impacts a spectral efficiency of a modulation and coding scheme, wherein the modulation and coding scheme is associated with a constellation of points that are each representative of a respective candidate sequence of bit values encoded with a corresponding combination of signal amplitude and carrier phase;
  - receive, based at least in part on transmitting the first control information, second control information that indicates a set of partitioning parameters, wherein the set of partitioning parameters is indicative of a hierarchical partitioning of the constellation into a plurality of subsets of points, and wherein the set of partitioning parameters are based at least in part on the additive white gaussian noise metric and the phase noise metric indicated by the first control information; and
  - decode a message modulated via the modulation and coding scheme, wherein the decoding is hierarchical based at least in part on the plurality of subsets of points.

2. The apparatus of claim 1, wherein the instructions are further executable by the processor to cause the apparatus to:
- determine, based at least in part on the set of partitioning parameters, a mapping between individual subsets of points of the constellation and respective levels of the hierarchical partitioning, each of the respective levels of the hierarchical partitioning also associated with a corresponding code rate comprised in the set of partitioning parameters or received in a third control information.

3. The apparatus of claim 2, wherein the instructions to decode the message are executable by the processor to cause the apparatus to:
- identify that the message includes an encoded sequence of bit values from the respective candidate sequence of bit values, wherein each respective level of the hierarchical partitioning is used to determine a value of one bit for each of one or more received points of the constellation.

4. The apparatus of claim 3, wherein the instructions are further executable by the processor to cause the apparatus to:
- decode a first bit for each of the one or more received points of the constellation using a first subset of points of the constellation and a first code rate associated with a first level of the hierarchical partitioning; and
- decode a second bit for each of the one or more received points of the constellation using a second subset of points of the constellation and a second code rate associated with a second level of the hierarchical partitioning, wherein the second subset of points is a subset of the first subset of points.

5. The apparatus of claim 2, wherein the mapping results in the spectral efficiency of the modulation and coding scheme satisfying a threshold value.

6. The apparatus of claim 1, wherein the instructions are further executable by the processor to cause the apparatus to:

estimate the additive white gaussian noise metric and the phase noise metric associated with the apparatus.

7. The apparatus of claim 1, wherein individual subsets of the plurality of subsets of points are based at least in part on Euclidean distances between points in the constellation, the Euclidean distances are based at least in part on the additive white gaussian noise metric and the phase noise metric indicated in the first control information.

8. The apparatus of claim 1, wherein the modulation and coding scheme is associated with quadrature amplitude modulation and the hierarchical partitioning comprises a quadrature amplitude modulation multi-level coding scheme.

9. The apparatus of claim 1, wherein the first control information is included in an uplink control information message and the second control information is included in a downlink control information message.

10. An apparatus for wireless communications, comprising:

a processor;

memory coupled with the processor; and instructions stored in the memory and executable by the processor to cause the apparatus to:

receive first control information that is indicative of an additive white gaussian noise metric and a phase noise metric, at a user equipment (UE), that impacts a spectral efficiency of a modulation and coding scheme, wherein the modulation and coding scheme is associated with a constellation of points that are each representative of a respective candidate sequence of bit values encoded with a corresponding combination of signal amplitude and carrier phase;

transmit, based at least in part on transmitting the first control information, second control information that indicates a set of partitioning parameters, wherein the set of partitioning parameters is indicative of a hierarchical partitioning of the constellation into a plurality of subsets of points, and wherein the set of partitioning parameters are based at least in part on the additive white gaussian noise metric and the phase noise metric indicated by the first control information; and transmit a message via the modulation and coding scheme, wherein decoding the message is hierarchical based at least in part on the plurality of subsets of points.

11. The apparatus of claim 10, wherein the instructions are further executable by the processor to cause the apparatus to:

map between individual subsets of points of the constellation and respective levels of the hierarchical partitioning, each of the respective levels of the hierarchical partitioning also associated with a corresponding code rate indicated to the UE via the set of partitioning parameters or via a third control information.

12. The apparatus of claim 11, wherein the instructions are further executable by the processor to cause the apparatus to:

encode, via the modulation and coding scheme, the message in accordance with the mapping associated with the set of partitioning parameters and the corresponding code rate for each of the respective levels of the hierarchical partitioning, the encoded message comprising an encoded sequence of bit values from the respective candidate sequence of bit values, wherein each respective level of the hierarchical partitioning is associated with a value of one bit for each of one or more points of the constellation.

13. The apparatus of claim 11, wherein the instructions to mapping are further executable by the processor to cause the apparatus to:

generate the individual subsets of points of the constellation and the corresponding code rate for the respective levels of the hierarchical partitioning such that the spectral efficiency of the modulation and coding scheme satisfies a configured threshold.

14. The apparatus of claim 11, wherein the instructions to mapping are further executable by the processor to cause the apparatus to:

select, from a predefined list, the individual subsets of points of the constellation and the corresponding code rate for the respective levels of the hierarchical partitioning such that the spectral efficiency of the modulation and coding scheme satisfies a configured threshold.

15. The apparatus of claim 10, wherein individual subsets of the plurality of subsets of points are based at least in part on Euclidean distances between points in the constellation, the Euclidean distances are based at least in part on the additive white gaussian noise metric and the phase noise metric indicated in the first control information.

16. The apparatus of claim 10, wherein the modulation and coding scheme is associated with a quadrature amplitude modulation scheme and the hierarchical partitioning comprises a quadrature amplitude modulation multi-level coding scheme.

17. The apparatus of claim 10, wherein the first control information is included in an uplink control information message and the second control information is included in a downlink control information message.

18. A method for wireless communications, at a user equipment (UE) comprising:

transmitting first control information that is indicative of additive white gaussian noise metric and a phase noise metric, at the UE, that impacts a spectral efficiency of a modulation and coding scheme, wherein the modulation and coding scheme is associated with a constellation of points that are each representative of a respective candidate sequence of bit values encoded with a corresponding combination of signal amplitude and carrier phase;

receiving, based at least in part on transmitting the first control information, second control information that indicates a set of partitioning parameters, wherein the set of partitioning parameters is indicative of a hierarchical partitioning of the constellation into a plurality of subsets of points, and wherein the set of partitioning parameters are based at least in part on the additive white gaussian noise metric and the phase noise metric indicated by the first control information; and decoding a message modulated via the modulation and coding scheme, wherein the decoding is hierarchical based at least in part on the plurality of subsets of points.

19. The method of claim 18, further comprising:

determining, based at least in part on the set of partitioning parameters, a mapping between individual subsets of points of the constellation and respective levels of the hierarchical partitioning, each of the respective levels of the hierarchical partitioning also associated with a corresponding code rate comprised in the set of partitioning parameters or received in a third control information.

20. The method of claim 19, wherein decoding the message comprises:

identifying that the message includes an encoded sequence of bit values from the respective candidate sequence of bit values, wherein each respective level of the hierarchical partitioning is used to determine a value of one bit for each of one or more received points of the constellation.

21. The method of claim 20, further comprising:

decoding a first bit for each of the one or more received points of the constellation using a first subset of points of the constellation and a first code rate associated with a first level of the hierarchical partitioning; and decoding a second bit for each of the one or more received points of the constellation using a second subset of points of the constellation and a second code rate associated with a second level of the hierarchical partitioning, wherein the second subset of points is a subset of the first subset of points.

22. The method of claim 19, wherein the mapping results in the spectral efficiency of the modulation and coding scheme satisfying a threshold value.

23. The method of claim 18, further comprising:

estimating an additive white gaussian noise metric and a phase noise metric associated with the UE.

24. The method of claim 18, wherein individual subsets of the plurality of subsets of points are based at least in part on Euclidean distances between points in the constellation, the Euclidean distances are based at least in part on the additive white gaussian noise metric and the phase noise metric indicated in the first control information.

25. The method of claim 18, wherein the modulation and coding scheme is associated with quadrature amplitude modulation and the hierarchical partitioning comprises a quadrature amplitude modulation multi-level coding scheme.

26. The method of claim 18, wherein the first control information is included in an uplink control information message and the second control information is included in a downlink control information message.

27. A method for wireless communications, at a network entity, comprising:

receiving first control information that is indicative of noise an additive white gaussian noise metric and a phase noise metric, at a user equipment (UE), that impacts a spectral efficiency of a modulation and coding scheme, wherein the modulation and coding scheme is associated with a constellation of points that are each representative of a respective candidate sequence of bit values encoded with a corresponding combination of signal amplitude and carrier phase;

transmitting, based at least in part on transmitting the first control information, second control information that indicates a set of partitioning parameters, wherein the set of partitioning parameters is indicative of a hierarchical partitioning of the constellation into a plurality of subsets of points, and wherein the set of partitioning parameters are based at least in part on the additive white gaussian noise metric and the phase noise metric indicated by the first control information; and transmitting a message via the modulation and coding scheme, wherein decoding the message is hierarchical based at least in part on the plurality of subsets of points.

28. The method of claim 27, further comprising:

mapping between individual subsets of points of the constellation and respective levels of the hierarchical partitioning, each of the respective levels of the hierarchical partitioning also associated with a corresponding code rate indicated to the UE via the set of partitioning parameters or via a third control information.

29. The method of claim 28, further comprising:

encoding, via the modulation and coding scheme, the message in accordance with the mapping associated with the set of partitioning parameters and the corresponding code rate for each of the respective levels of the hierarchical partitioning, the encoded message comprising an encoded sequence of bit values from the respective candidate sequence of bit values, wherein each respective level of the hierarchical partitioning is associated with a value of one bit for each of one or more points of the constellation.

* * * * *